United States Patent [19]

Fouquet et al.

[11] Patent Number: 5,699,462
[45] Date of Patent: Dec. 16, 1997

[54] TOTAL INTERNAL REFLECTION OPTICAL SWITCHES EMPLOYING THERMAL ACTIVATION

[75] Inventors: Julie E. Fouquet, San Carlos; Phillip W. Barth, Portola Valley; Kok-Wai Chang, Sunnyvale; Leslie A. Field, Portola Valley; Eric G. Hanson, Burlingame; Long Yang, Union City; David K. Donald, Monto-Sereno, all of Calif.

[73] Assignee: Hewlett-Packard Company, Palo Alto, Calif.

[21] Appl. No.: 663,503

[22] Filed: Jun. 14, 1996

[51] Int. Cl.[6] .................................................. G02F 1/00
[52] U.S. Cl. ........................................... 385/18; 385/17
[58] Field of Search ................................ 385/15–18, 4,5

[56] References Cited

U.S. PATENT DOCUMENTS

| | | | |
|---|---|---|---|
| 4,505,539 | 3/1985 | Auracher et al. | 385/18 |
| 4,615,580 | 10/1986 | Mayer | 385/19 |
| 4,648,686 | 3/1987 | Segawa | 385/17 |
| 4,988,157 | 1/1991 | Jackel et al. | 350/96.13 |
| 5,073,000 | 12/1991 | Derfiny | 385/14 |
| 5,204,921 | 4/1993 | Kanai et al. | 385/17 |
| 5,210,801 | 5/1993 | Fournier et al. | 385/14 |
| 5,255,332 | 10/1993 | Welch et al. | 385/17 |
| 5,440,654 | 8/1995 | Lambert, Jr. | 385/17 |
| 5,498,444 | 3/1996 | Hayes | 427/162 |

FOREIGN PATENT DOCUMENTS

| | | | |
|---|---|---|---|
| 8-62645 | 3/1996 | Japan | G02F 1/31 |
| 5-88030 | 4/1996 | Japan | G02B 6/12 |
| 8-94866 | 4/1996 | Japan | G02B 6/12 |

OTHER PUBLICATIONS

Jackel, Janet L. et al.; "Bistable Optical Switching Using Electrochemically Generated Bubbles", Optics Letters, Dec. 15, 1990, vol. 15, No. 24, pp. 1470–1472.

*Primary Examiner*—John D. Lee
*Assistant Examiner*—Ellen E. Kang

[57] ABSTRACT

A switching element defines a transmitting state and a reflecting state for a pair of intersecting waveguides that have a gap at their intersection. In the preferred embodiment, the switching element exhibits total internal reflection at the gap sidewall from one waveguide to the other when not in the transmitting state. In the transmitting state, index-matching liquid fills the gap, enabling light to continue in the original waveguide direction. The switching element may use ink jet techniques or bubble techniques to displace index-matching liquid. The index-matching fluid may be projected from a gap between the waveguides by a jet mechanism, or a vapor or dissolved gas bubble may be formed to fill the gap between the waveguides to provide the reflecting state for the switching element. Using either of the techniques, heaters are employed to initiate the switching operation. In some embodiments, more than one heater is utilized. In the preferred embodiment, waveguides are formed on one substrate and heaters are formed on another. Then the substrates are aligned and bonded together to position the heaters in very close proximity to the intersection between the waveguides. Preferably, the switching element is one element in a matrix of such elements for routing signals between arrays of input and output waveguides.

27 Claims, 13 Drawing Sheets

TOTAL INTERNAL REFLECTION OPTICAL SWITCHES EMPLOYING THERMAL ACTIVATION

TECHNICAL FIELD

The invention relates generally to switching elements and more particularly to switches for routing optical signals within waveguides or fibers.

BACKGROUND ART

Optical signals are switched in both telecommunication systems and data communication systems. In circuit switching, any one of an array of parallel input optical fibers may be connected to any one of an array of output optical fibers using a matrix of non-blocking optical crossbar switches. The term "non-blocking" is used to refer to an arrangement in which any free input fiber can be connected to any free output fiber, regardless of what connections have already been made through the switching arrangement. In packet switching, an incoming data packet from a particular input fiber is directed to a selected output fiber based upon the destination of the packet. The direction of any packet from an input fiber to an output fiber should not block the routing of any other packet, unless both packets share the same destination. Some commercial circuit switches are available which route signals in optical form. Optical packet switches are currently only a research topic, so in practice optical packets are switched by converting the signals to electrical form, then reconverting the signals to optical form after the switching has been accomplished.

In many optical circuit switching applications, the time to switch between states is not an issue, even if the optical fiber carries data at a high bit rate. The states of optical patch panels typically are changed very infrequently, so that signals are routed from a given input to a single destination for long lengths of time. A piezo-electrically driven system has been designed to replace patch panels in telecommunication operations requiring more frequent changes of state. However, such a system may be cost-ineffective for most data communication applications.

U.S. Pat. No. 4,988,157 to Jackel et al. describes a more promising approach. The approach of Jackel et al. is to provide bi-stable optical switching using electrochemically generated bubbles. Parallel input waveguides and parallel output waveguides are formed on a substrate at perpendicular angles so as to intersect. A 45° slot is formed across each intersection. The slots are selectively filled with a fluid, such as water, or refractive index-matching liquid. Electrodes are positioned adjacent to the slots and are selectively activated to electrolytically convert the fluid to gaseous bubbles. The electrolytic formation of the bubbles destroys any index matching across the slots and causes light to be reflected at the slot sidewall. Thus, an electrolytically formed bubble within a particular slot results in reflection of optical data at the slot, rather than propagation across the slot. The presence of either a catalyst, an electrical pulse of opposite polarity, or an electrical pulse of significant size and of the same polarity will destroy the bubble, thus returning the switch to a transmissive state.

The approach taken by Jackel et al. in providing a non-blocking optical crossbar switching arrangement is simple, is potentially inexpensive in large quantities, and achieves a number of advantages over prior approaches. However, further improvements may be realized. Where water is used as the fluid, electrolysis generates $H_2$ and $O_2$ bubbles in order to create a reflecting state, but the water itself provides a poor index match to the waveguides. Thus, crosstalk is high if water is to be employed. Another concern is that the bubble-creation process and the bubble-removal process may be too slow to meet the desired transition time for telecommunication protection switching. Furthermore, the slots are so wide that transmission losses are potentially significant, and sidwalls are so rough that crosstalk is often large.

U.S. Pat. No. 5,204,921 to Kanai et al. describes an automated optical patch panel replacement for the main distributing frame in a telephone office or a data communication office. The main distributing frame interconnects external subscriber optical lines with office optical lines by means of jumpering operations. A matrix waveguide includes an array of crosspoints coupled with the external lines and with the office lines. The matrix waveguide includes a groove at each crosspoint, so that the crosspoint may be switched "on" or "off," depending upon whether the groove is filled with an index-matching oil. The index-matching oil has a refractive index close to that of the waveguides. An optical signal transmitted through a waveguide is transmitted through the crosspoint when the groove is filled with the matching oil, but the signal changes its direction at the crosspoint through total internal reflection when the groove is empty. The jumpering operation to connect or disconnect a crosspoint is carried out by a robot that fills or removes index-matching oil at designated coordinates. However, the robotic jumpering operations are not high speed and the robot is expensive.

Other applications of non-blocking optical crossbar switches require higher switching speeds. For example, telecommunications protection switching requires a 50 ms change of state. Conventionally, data traffic is bursty by nature. Data are sent in packets, with different types of networks being associated with different bit rates. Moreover, the number of bytes in data packets may vary even within a single standard. High-speed communications may require each packet to be routed independently of the others. The destination of an individual optical packet could be read by diverting a small portion of the control signal to a subsidiary photodetector receiver, with the receiver generating a request to a controller of the optical switches for routing the individual packet. It is desirable that the optical packet switches be able to change states quickly, e.g., in approximately 10 µs, or even shorter times.

Alternatively, electronic switches with optical inputs and outputs have been designed to meet the needs of data communications. However, if multiple destinations are required, an electronic switch with multiple ports must be purchased. For high-speed operations, each input pork requires a photodetector and each output port requires a high-speed laser, or light emitting diode, so that there is a significant investment in optoelectronic conversion equipment if electronic switches are utilized.

Numerous types of optical switches have been reported. However, most of the reported approaches do not meet the requirements for high-speed communication and are not scalable to large numbers of fibers. Many of the optical switches extinguish light—losing a signal—rather than diverting the light. Some diverting optical switches redirect the light in inappropriate directions, such as back at the source. Most optomechanical switches change state too slowly for telecommunications protection applications. Traditional waveguide interference switches use some mechanism to alter the refractive index of an area, thereby changing the operation between constructive and destructive interference. These and related waveguide switches relying on refractive index change consume large amounts of surface area on substrates for switches having high fiber counts. Unfortunately, most of the substrates are expensive. Polymer waveguide substrates provide some cost savings, but suffer from problems such as uncontrolled shrinkage and high signal attenuation. It is also difficult to obtain low crosstalk with switches which rely on change in refractive index of waveguides. Some other switches work only for solitons, while most networks use pulses which are not solitons.

What is needed is a switching element and arrangement which allows reliable transitions between transmitting states and diverting state, thereby controlling optical communication between optical signal lines.

SUMMARY OF THE INVENTION

A switching element is thermally actuated to displace liquid from a gap at the intersection of a first optical waveguide and a second optical waveguide. The actuation is achieved by heaters that create bubbles by vaporizing a liquid in the gap or by degassing a fluid that contains dissolved gas. A combination of these effects may be beneficial, because a gas can provide a nucleation site to promote vaporization. The gap separates each waveguide into two coaxial segments, called A and B. Filling the intersection with liquid causes light from the first waveguide's segment A to continue into the segment B of the same waveguide. However, filling the intersection with gas creates a refractive index mismatch that causes light from the first waveguide's segment A to be diverted at the intersection. The diversion of the light is preferably in the direction of segment B of the second waveguide, such that the thermal actuation determines whether light from the first waveguide's segment A enters either the first waveguide's segment B or the second waveguide's segment B. In the preferred embodiment, there is a matrix of switching elements for controlling optical communication between input optical waveguides and output optical waveguides that cross the input waveguides. The "waveguides" may be optical fibers, but are typically waveguide structures fabricated on a substrate.

In a modulator embodiment, there is a single waveguide that is divided into segments A and B by the gap. The operation and physics are generally the same as the embodiment that includes two waveguides, but the light is not diverted into a second waveguide when the gap between the two segments is filled with gas.

The fabrication of the switching elements, preferably includes bonding a waveguide structure to a heater structure. Prior to the bonding step, the optical waveguides are formed on the waveguide structure and microheaters are formed on the heater structure. The two structures are aligned to position microheaters at the intersections of the waveguides, and the structures then are bonded together. Optionally, a cap may be formed "above" each intersection to retard overgrowth of bubbles.

Each thermally actuated switching element may be operated utilizing techniques employed in inkjet printing, explosively ejecting fluid from one location to another. In another embodiment, the thermally actuated switching element vaporizes a small bubble in a trench to divert the optical signal from one waveguide to another. Bubbles may also be formed by degassing. In each of these embodiments, microheaters are in contact with a liquid having a refractive index that substantially matches the refractive index of the optical waveguides. Increasing the temperature reduces the refractive index, which can allow total internal reflection to be obtained at a particular temperature. An acceptable implementation is one in which $SiO_2$ waveguides are formed on a silicon or silica substrate and the chamber is formed by etching trenches through the $SiO_2$ waveguides to provide fluid to operate the switch and to provide a path for liquid flow towards and away from the heaters. Alternatively, liquid flow paths may be etched through a silicon substrate of the waveguides. Other flow paths are also possible.

In alternate embodiments the gap is filled with a solid whose refractive index matches that of the waveguides. As temperature increases, the refractive index decreases to allow total internal reflection. The solid may melt into a liquid at high temperature in one embodiment.

Whether inkjet, bubble or solid techniques are to be employed in operation of the switching elements, microheaters are formed on a substrate and the actuation mechanism for changing the refractive index to activate total internal reflection is thermal. The microheaters in a liquid switch are individually addressed to cause liquid in the gap at the intersection between two optical waveguides to be displaced.

In one embodiment, a switching element is operatively associated with a jet mechanism that is directed to project index-matching liquid into a gap between two or more optical waveguide sections. For a matrix of switching elements, the array of jet mechanisms may be formed along a second substrate that is spaced apart from the waveguide substrate. Actuation of a microheater of a jet mechanism will cause a thin layer of the index-matching liquid to heat rapidly. When the liquid reaches its superheat temperature limit, the material can no longer exist in the liquid state. The liquid rapidly vaporizes, creating a pressure wave that acts in the same manner as a piston to fire a controlled volume of the liquid into the associated gap between adjacent, waveguides. Upon reaching the gap, surface tension or other forces maintain the index-matching liquid within the gap, so that the switching element is in a transmitting state. In order to switch to the reflecting state, the index-matching liquid may be evacuated from the gap by another inkjet-like actuation mechanism. In this embodiment, the switching element can be held in either the transmissive or the reflective state for an indefinite length of time, and that state will be retained even if power fails. In another embodiment, vacuum pressure can be applied at a side of the waveguide structure opposite to the array of jet mechanisms. However, in this embodiment, each switching element is normally reflective and can be made to transmit for only a brief period of time, which may not be the desired situation for telecommunication or data communication via crossing arrays of input waveguides and output waveguides. If a small enough, fast enough, reliable microvalve becomes available, it can be used between the trench and the source of the vacuum pressure to retain fluid in the trench for longer periods of time.

A normally transmissive embodiment is achieved by forming the individually-addressed microheaters on a substrate and attaching the resulting structure to the waveguide layer, so that the index-matching liquid is fired from a gap between waveguides upon activation of a microheater. For example, if the waveguides lie in a horizontal plane, the liquid is fired vertically. The switching element remains in a transmitting state until the liquid is fired. The chamber may be refilled after firing by utilizing capillary force. Alternatively, the firing of the liquid may shift the fluid to a second chamber having a second microheater. Refilling of the original chamber is then accomplished by energizing the second individually-addressed microheater. Thus, a push-pull arrangement is provided using this embodiment.

In another embodiment, the optical waveguides are formed on an upper substrate having a first jet mechanism. A lower substrate has a second jet mechanism that is provided with index-matching liquid by means of capillary action. The switching element is changed from a reflecting state to a transmitting state by actuating the lower jet mechanism to fill a chamber of the upper jet mechanism and to fill simultaneously a gap between the optical waveguides. The switch from a transmitting state to a reflecting state is provided by firing the upper jet mechanism, with the ejected index-matching liquid being returned subsequently to a liquid reservoir by means of capillary action. In yet another embodiment using the inkjet approach, a lower jet mechanism is fired to fill the chamber of an upper jet mechanism, so that the switching element is in a transmitting state, but activation of the upper jet mechanism fires the liquid upwardly, rather than toward the lower jet mechanism. The lower jet mechanism is subsequently refilled by capillary action.

Using the bubble approach, rather than the inkjet approach, further removes some of the complexity of optical switching. The switching elements are simply immersed in index-matching liquid. A microheater vaporizes index-matching liquid to form a vapor bubble at the gap between the optical waveguides. Once the vapor bubble has been formed, the bubble can be maintained at a lower heater current. When it is desired to switch back to the transmitting state, current to the microheater is terminated and the vapor bubble condenses. This mechanism should be sufficiently rapid for telecommunication protection switching applications, but not as rapid as the jet mechanisms. Switching speed is further enhanced by providing a second microheater in a position away from the intersection between the optical waveguides. The formation of a vapor bubble by the second microheater will then operate to forcibly remove the blocking vapor bubble from the intersection.

In addition to the inkjet approach and the vapor bubble approach, microheaters may be used to implement a gas-bubble manipulation approach. In this embodiment, a microheater is brought to a temperature less than that necessary to vaporize fluid, but sufficiently high to degas the fluid to form a bubble. A first microheater is positioned to locate the bubble at an intersection between the first waveguide and the second waveguide, thereby causing light exiting from the first waveguide to be diverted. To return the switching element to a transmitting state, a second microheater, which is spaced apart from the waveguide intersection, is activated and the first microheater is deactivated. The second microheater draws the bubble from the intersection. The second microheater is necessary because the "dissolved" gas bubble persists after the microheaters are turned "off," unlike the vapor bubbles. Acceptable liquids for this embodiment include M-pyrol (also known as NMP and 1-methyl, 2-pyrrolidinone) or a combination of isopropyl alcohol and glycerol.

While the invention is preferably used to form a matrix of switching elements to regulate optical communication between crossing input and output optical guides, this is not critical. The switching elements may be used in other applications, e.g. to provide modulation for optical transmission between only two crossing optical waveguides, or to control an input from a single incident waveguide to any of a linear array of output waveguides.

An advantage of the invention is the absence of friction between solid objects. Blowing a bubble and moving a bubble back and forth are inherently simple operations on the macroscopic scale. The switching element is diverting rather than extinguishing and is relatively polarization independent. The arrangement is compact, exhibits low crosstalk, is scaleable to large numbers of fibers, and is inexpensive to manufacture.

BEST MODE FOR CARRYING OUT THE INVENTION

Figure 1:
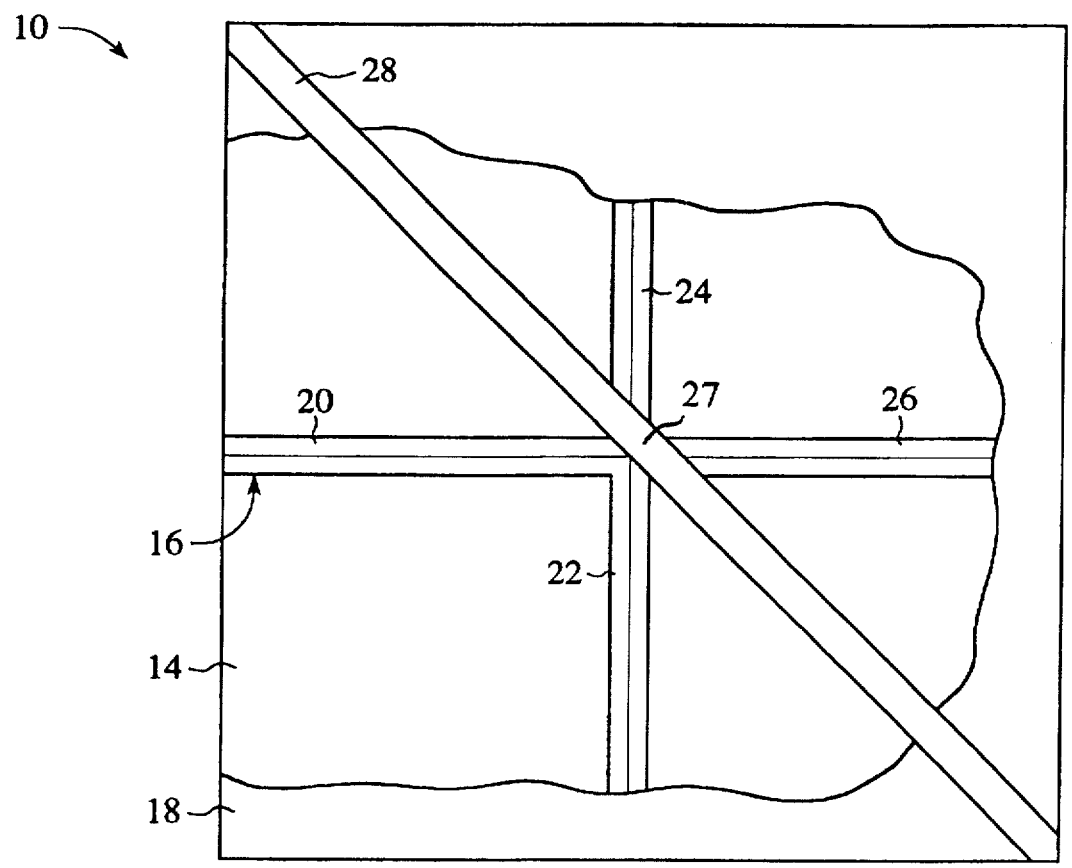
FIG. 1 is a top view of an optical switch that utilizes total internal reflection when the switch is in a reflecting state.

With reference to FIG. 1, an optical switch 10 is shown as being formed on a substrate. The substrate is preferably a silicon substrate, but other materials, such as silica, may be used. The advantages of a silicon substrate are that it facilitates the use of integrated circuit fabrication techniques to form the optical switch, and it can be etched through to form channels for fluid flow perpendicular to the plane of the substrate.

The optical switch 10 includes a planar waveguide defined by a lower cladding layer 14, a core 16 and an upper cladding layer 18. During fabrication, a core layer of material is deposited and etched to form two intersecting waveguides. An input segment 20 of the first waveguide is aligned for transmission to an output segment 26 of the same waveguide, while an input segment 24 of the second waveguide is aligned for transmission to an output segment 22 of the second waveguide. The ends of the waveguide segments 20–26 intersect at the gap 27. As will be explained more fully below with reference to FIG. 2, the switch 10 is a single switching element in an array of switches.

Hitachi Cable, Photonic Integration Research, Inc. (PIRI) in Columbus, Ohio and PIRI's parent company Nippon Telegraph and Telephone Corporation have demonstrated the ability to form waveguides in $SiO_2$ on silicon substrates. The core 16 may be formed of a material that is primarily $SiO_2$, but which includes another material, such as Ge or $TiO_2$. The cladding material 14 and 18 may be formed of a material that is primarily $SiO_2$, but which includes other materials, such as $B_2O_3$ and/or $P_2O_5$. Because the core material has a refractive index that is different from the refractive index of the cladding layers 14 and 18, optical signals will be guided along the optical waveguides 20–26. The companies mentioned above are able to etch trenches through the waveguide with smooth (approximately 200 Å roughness), straight (less than one degree from the vertical) sidewalls. The trenches can be etched down through the waveguide layers to the silicon substrate.

The trench 28 etched through the waveguide segments 20–26 at their intersection forms the gap 27. The waveguide segments intersect the trench 28 at an angle of incidence greater than the critical angle for total internal reflection when the trench is filled with a vapor or gas. Thus, total internal reflection (TIR) diverts light from the input segment 20 of the first waveguide to the output segment 22 of the second waveguide, unless an index-matching material is located within the gap 27 between the aligned segments 20 and 26 of the first waveguide. The angle of the output segments is chosen to match the angle of incidence of the input segments on the trenches, since the angle of incidence equals the angle of reflection. The trench 28 is ideally positioned with respect to the two waveguides so that one sidewall of the trench passes directly through the intersection of the axes of both waveguides. Then, light can be deflected between the waveguides (e.g. from 20 to 22) with minimal loss.

Figure 2:
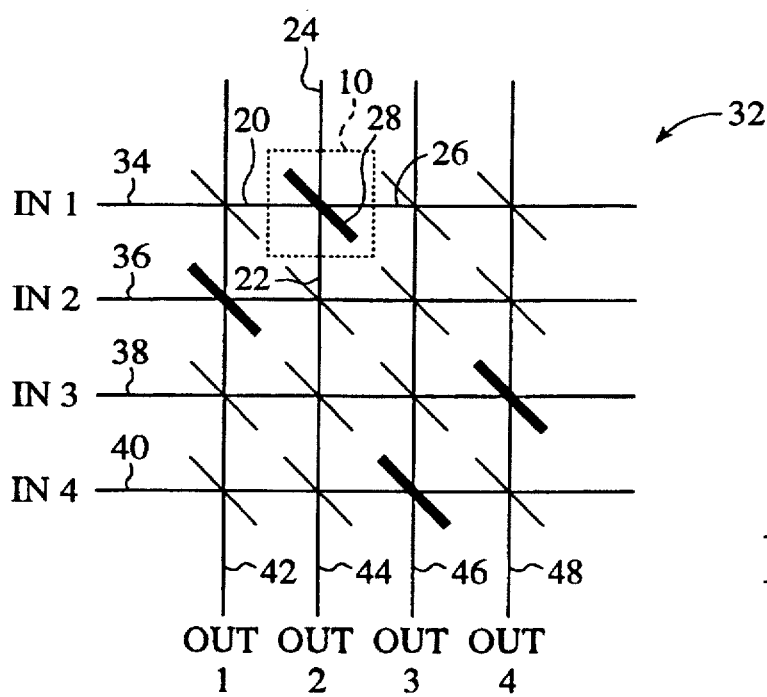
FIG. 2 is a matrix of switching elements of FIG. 1 so as to selectively connect a linear array of input waveguides to a linear array of output waveguides.

Referring now to FIG. 2, a 4×4 matrix 32 of switching elements is shown. In this arrangement, any one of four input waveguides 34, 36, 38 and 40 may be connected to any one of four output waveguides 42, 44, 46 and 48. The switching arrangement is therefore a non-blocking optical cross-connect switching matrix for telecommunications or data communications. Each of the sixteen switch elements has a trench that causes TIR in the absence of an index-matching liquid, since the angle of the trench relative to an input waveguide is selected to cause TIR from an input waveguide to an output waveguide. However, if the trench between collinear sections of one of the waveguides of FIG. 2 is filled with an index-matching liquid, the switch element is in the transmitting state. Liquid-filled trenches are represented by fine lines that extend at an angle through intersections of optical waveguides in the array. On the other hand, trenches having an absence of index-matching liquid are represented by broad lines through a point of intersection.

The input segment 20 of FIGS. 1 and 2 is in optical communication with output segment 22 as a result of reflection at the empty trench 28. Since all other crosspoints for allowing the input waveguide 34 to communicate with the output waveguide 44 are in a transmissive state, a signal that is generated at input waveguide 34 will be received at output waveguide 44. In like manner, input waveguide 36 is optically connected to the first output waveguide 42, the third input waveguide 38 is optically connected to the fourth output waveguide 48, and the fourth input waveguide 40 is connected to the third output waveguide 46.

FIG. 2 shows the input waveguides 34–40 as intersecting with the output waveguides 42–48 at 90° angles, with 45° incidence angles at the trenches. However, other angles are possible. For the most efficient operation, the angle of incidence of all rays in the input waveguide to the trench should be great enough for total internal reflection. In practice an angle of incidence of 60° on the trench accommodates standard multimode waveguides.

As previously noted, the preferred method of fabricating the switches 10 to form the switching matrix 32 is to use integrated circuit processing techniques. The planar waveguide uses techniques such as masking, deposition and etching to produce a large number of identical waveguide features. This allows a non-blocking switch arrangement having a large number of input/output connections. The fabrication techniques will be described in greater detail below, with reference to FIGS. 20–26.

For an M×N switching arrangement, there are potentially MN switching points. If implemented by bulk optics approaches, MN precision alignments need to be performed. However, by using the planar waveguide approach, the MN alignments are accomplished simultaneously by photolithographic processing. This leaves M+N alignments to properly position input fibers and output fibers to the input and output waveguides 34–48. Preferably, the waveguides have a spacing of 250 µm, thereby facilitating interconnection with fiber ribbon cables. The use of fiber ribbon cables further relaxes the alignment procedure in coupling fibers to the switching matrix 32.

In addition to the diversion approach in FIG. 1, the invention may be utilized to implement a modulator. That is, if the second waveguide is deleted, so that only segments 20 and 26 remain, the presence or absence of index-matching fluid within the trench 28 will determine whether a signal from the input segment 20 will be transmitted to the output segment 26. In the absence of the index-matching fluid, the signal is diverted, but it is not diverted to a second waveguide.

Figure 3:
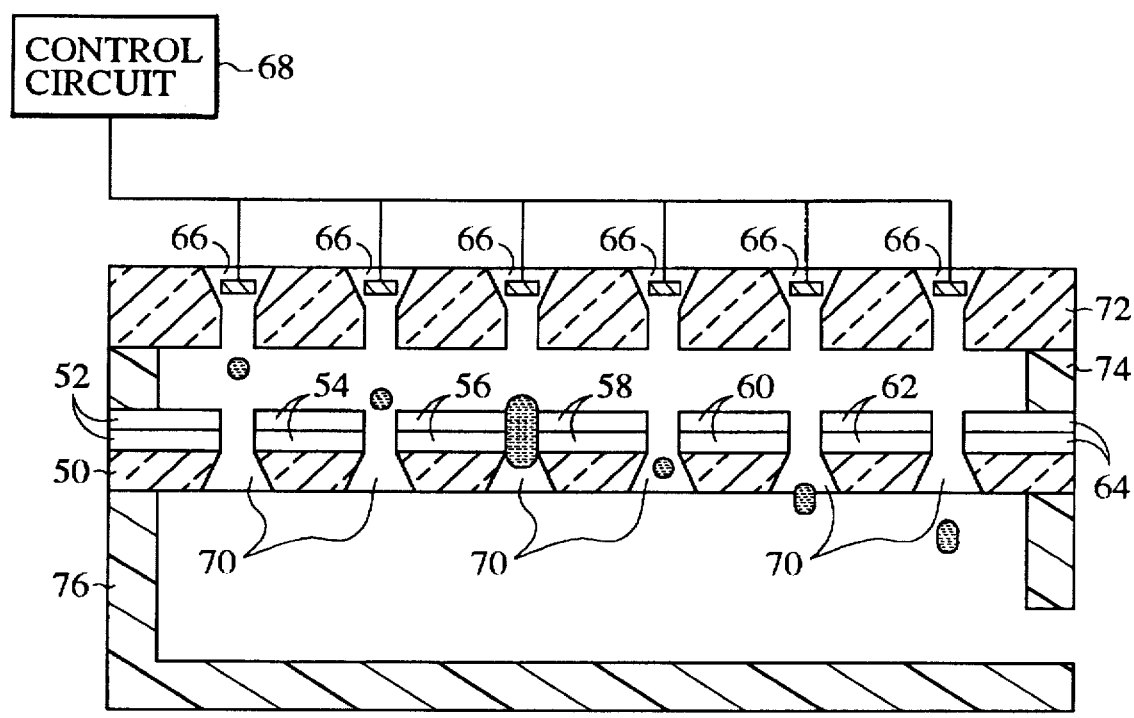
FIG. 3 is a side sectional view of six switching elements using jet mechanisms to project index-matching liquid into gaps between adjacent optical lines in accordance with one embodiment of the invention.

FIG. 3 is a simplified schematic representation of one embodiment of the use of inkjet technology to control liquid motion that is perpendicular to a waveguide substrate 50. The figure shows seven waveguide segments 52, 54, 56, 58, 60, 62 and 64 that are defined by cladding and core layers of the type described above. Adjacent segments are separated by a gap that prevents optical transmission between the segments, unless an index-matching liquid is positioned between the adjacent segments. In FIG. 3, only segments 56 and 58 are in optical communication.

Individually addressed jet mechanisms 66 are aligned with the gaps between the optical waveguide segments 52-64. Each jet mechanism includes a microheater. Optionally, the microheaters are formed in the same manner as jet mechanisms of a thermal inkjet print head. A control circuit 68 regulates activation of the jet mechanisms.

As previously noted, the index-matching fluid has been vertically deposited into the gap between segment 56 and segment 58, so that the switching element that includes the gap and the jet mechanism associated with the gap is in a transmitting state. In comparison, the five remaining switching elements are in a reflecting state. Index-matching liquid is shown as being projected from the first two jet mechanisms toward the gaps between segment 54 and its two adjacent segments 52 and 56. Unless the index-matching liquid is evacuated from the first three gaps, waveguide segment 52 will be placed in communication with segment 58.

The evolution of liquid evacuation is also illustrated in FIG. 3. A source of vacuum is connected at the underside of the waveguide substrate. Openings 70 to the gaps between adjacent waveguide segments 52-64 are formed through the waveguide substrate by etching through holes, thereby creating a liquid flow path that is perpendicular to the waveguide plane. In the preferred embodiment, said gaps are individually addressable by the vacuum source. The index-matching liquid is evacuated from a particular gap between two waveguide segments 52-64 by selectively connecting the vacuum source to the particular gap. For example, the gap between optical segments 58 and 60 has only recently been switched from the transmitting state to the reflecting state by the pull of the liquid into the opening 70 below the gap. Optical communication between segments 58 and 60 can again be established by projecting a second volume of index-matching liquid from the axially-aligned jet mechanism 66. A micro machined valve may be used to control liquid flow and thus retain the liquid in the gap for a period of time. However, in practice microvalve technologies which are small enough to work with the desired 250 μm fiber spacing are not very reliable. In another embodiment, the index-matching fluid briefly remains within the gap between two adjacent segments by means of surface tension. Optionally, the surfaces of the waveguide layers can be treated, so that the liquid does not wet very well, other than within the gaps. This reduces any susceptibility to a spill-over to a neighboring gap. Thus, no microvalves are required. However, most of the switches are in the reflecting state most of the time, while in practice most of the switches should be in the transmitting state most of the time, as shown in FIG. 2.

The array of jet mechanisms 66 is contained on a substrate 72 that is spaced apart from the waveguide substrate by a spacer 74 with either an adhesive function to bond or clamping mechanism to hold the jet mechanisms in an aligned position with respect to the gaps. Proper operation of the switching arrangement requires precise alignment of the jet mechanisms with the array of gaps between adjacent waveguide segments 52-64. Below the waveguide substrate 50 is a housing 76 having an aperture for connection to the vacuum source. However, as previously noted, the preferred embodiment is one in which the six openings 70 below the gaps are individually addressable by the vacuum source.

Figure 4:
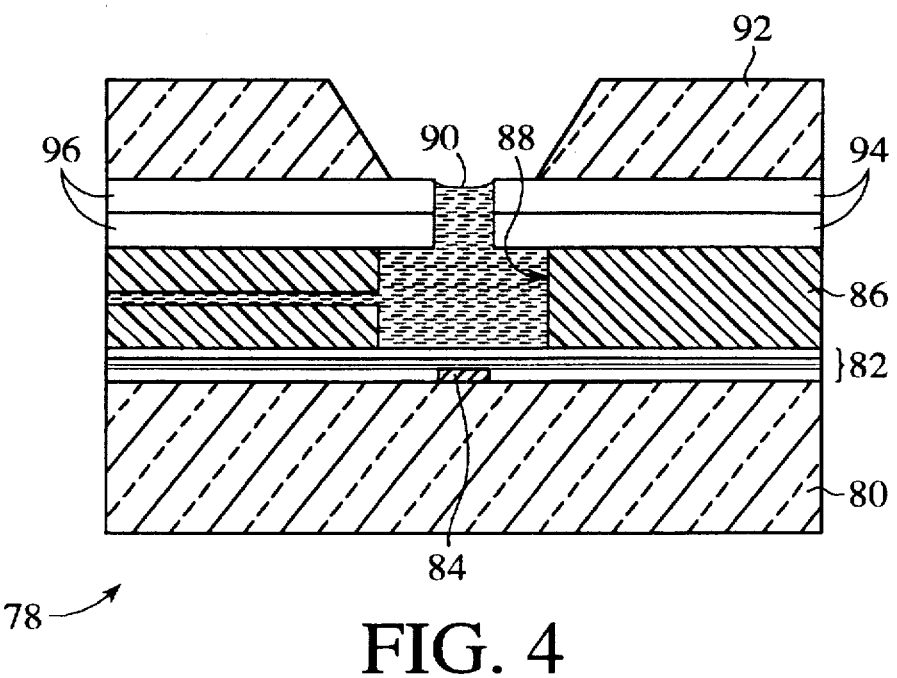
FIG. 4 is a side sectional view of a second embodiment of a switching element for projecting index-matching fluid from a gap between optical lines, with the switching element being shown in a transmitting state.

FIG. 4 illustrates another embodiment of a switching element 78. In this embodiment, the switch is normally transmissive. A heater substrate 80 has a number of layers 82 and a heater 84 that may be fabricated in a manner very similar to inkjet fabrication. That is, the heater and its protective layers can be deposited using the techniques for inkjet heater fabrication. As an example, the heater may be a resistor formed of TaAl and the layers that are represented by reference numeral 82 may include a thermal underlay of $SiO_2$, an aluminum conductor, a $SiC_x+SiN_x$ electrical passivation layer, and a cavitation-resistant Ta overcoat. These materials have demonstrated good reliability in the presence of fluids. However, other materials may be used.

Atop the layers 82 is a layer 86 that provides the structure for defining chamber walls 88 for holding a quantity of liquid 90. The layer 86 can be built up from the same printed circuit board solder mask material as used for inkjets. Alternatively, phosphosilicate glass may be utilized. While the conductor that is among the layers 82 in order to form the leads to the heater 84 is shown as extending along the surface of the substrate 80, it is also possible to form the leads to penetrate the substrate. Penetrating the substrate will allow larger arrays of switches to be addressed than can be addressed on the top side, e.g. using matrix address schemes.

A waveguide substrate 92 includes a pair of waveguides 94 and 96. In this two-dimensional side view, component 96 represents one section of each of two waveguides, with an input signal from a segment of a first waveguide being diverted to a segment of the second waveguide when the switching element is in the reflecting state of FIG. 5. Component 94 represents the other two waveguide segments of the first and second waveguides, with the two segments of component 94 being optically isolated from the two segments of component 96 unless the switching element is in the transmitting state of FIG. 4. For example, 96 can represent waveguide segments 20 and 22 from FIG. 1, while 94 can represent waveguide segments 24 and 26 from FIG. 1. A trench is shown as being formed into the waveguide substrate 92 in alignment with the gap between the two waveguides. The waveguide substrate is shown in an inverted position, with the "upper" cladding layer of the waveguide segments 94 and 96 being in contact with the layer 86 that forms the chamber walls 88. Typically, the "upper" cladding layer will be bonded to the layer 86. An acceptable material which can both form the chamber walls and bond to the waveguides is a photoimageable polymer. In an alternative embodiment, layers that promote adhesion (not shown) can be deposited upon the waveguides before the bonding step. In another embodiment, the waveguide structure can be clamped to the heater structure.

Figure 5:
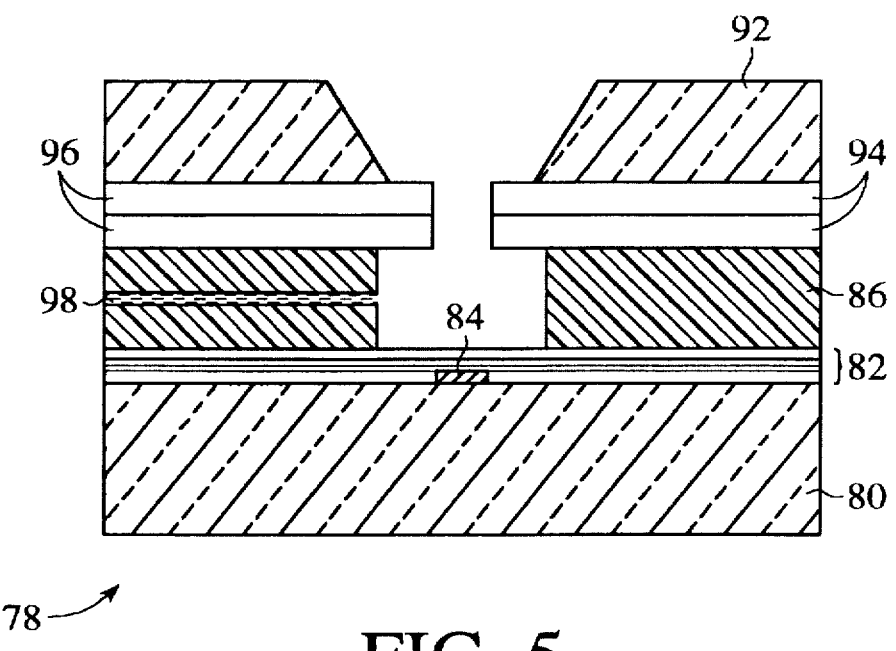
FIG. 5 is a side sectional view of the switching element of FIG. 4, shown in a reflecting state.

In FIG. 4, the switching element 78 is shown as being in a transmitting state, since the index-matching liquid 90 fills the gap between the segments of waveguides 94 and 96. The liquid has a refractive index that substantially matches the refractive index of the optical waveguides. As a result, optical signals will be transmitted from one waveguide to the other waveguide. On the other hand, the same switching element 78 is shown in FIG. 5 as being in the reflecting state. When the heater 84 is energized, the liquid will begin to vaporize. In a short period of time, the liquid will be projected from the chamber and the gap between the waveguides, with the gap functioning as a nozzle. The resulting index mismatch at the interface of a waveguide and the liquid-free gap will cause any input signal to be diverted.

In the embodiment of FIGS. 4 and 5, the projected liquid 90 may be cycled to a reservoir. The reservoir may be a sponge. The reservoir is in contact with a flow path 98 through the layer 86 such that the chamber that is defined by the layer 86 is refilled by capillary action. The refill returns the switching element to the transmitting state of FIG. 4. Without intervention of a valve or other means, this refill will take 10 to 1000 µs. The embodiment of FIGS. 4 and 5 is one that is normally transmitting. A microvalve on the flow path 98 would allow the switch element to remain in the reflecting state for an extended period of time.

Figure 6:
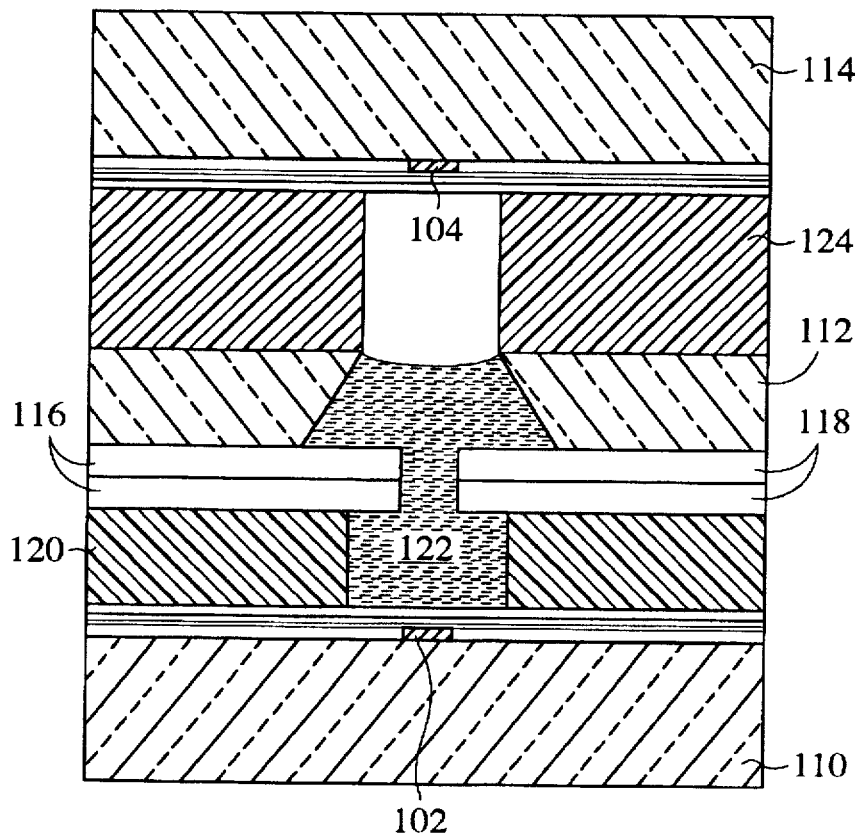
FIG. 6 is a side sectional view of a push-pull embodiment of a switching element using a pair of jet mechanisms, with the switching element being shown in a transmitting state.
Figure 7:
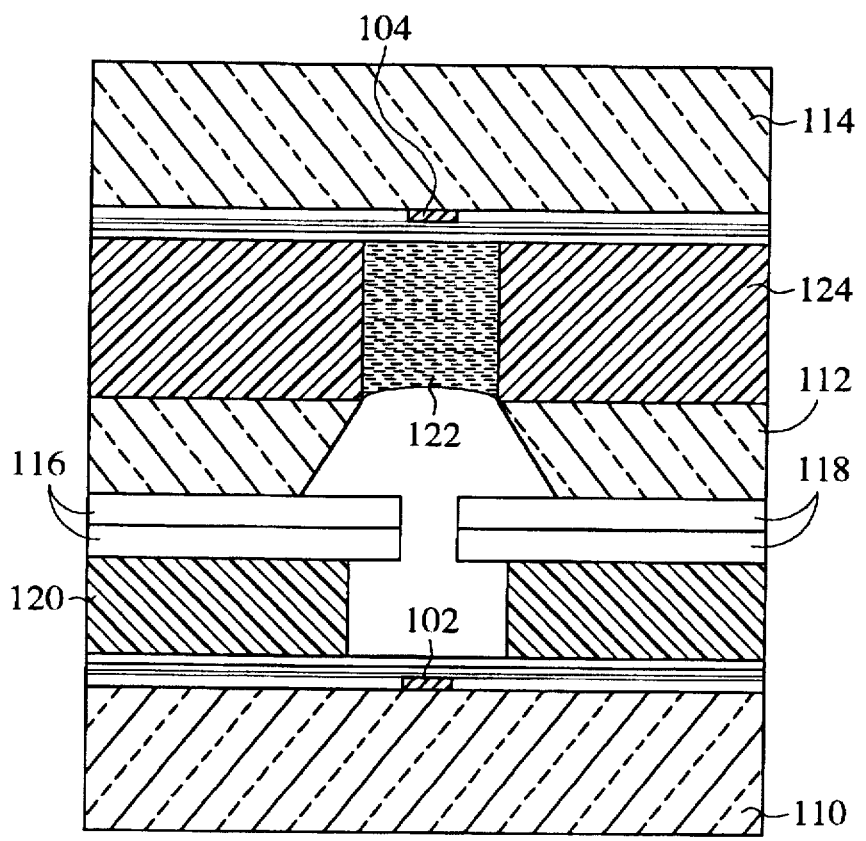
FIG. 7 is a side sectional view of the switching element of FIG. 6, shown in a reflecting state.

A push-pull embodiment of an optical switching element 100 is shown in FIGS. 6 and 7. The switching element is in a transmitting state in FIG. 6 and in a reflecting state in FIG. 7. The push-pull configuration allows rapid switching between transmission and reflection. The maximum switching speed is a function of the speed at which microheaters 102 and 104 cool. The cooling rate of the microheaters can be controlled to some extent by altering the layers between the heaters and their substrates, which serve as heat sinks.

The switching element 100 may be fabricated by using two bonds between three substrates 110, 112 and 114. The lower microheater substrate 110 is similar to that of substrate 80 of FIGS. 4 and 5. The waveguide substrate 112 is similar to the waveguide substrate described above, but is typically thinner. Again, the "upper" cladding layer of two crossing waveguides represented by 116 and 118 is bonded to a layer 120 that defines the chamber for storing index-matching liquid 122. The upper microheater substrate 114 includes a chamber-defining layer 124 that is bonded to the waveguide substrate 112. While not shown, there may be a flow path to provide the means for initially providing the liquid and for replenishing the liquid when needed.

In order to change the switching element 100 from the transmitting state of FIG. 6, the lower microheater 102 is energized to begin vaporization of the index-matching liquid 122. When the liquid reaches the proper temperature, the liquid is propelled upwardly to the upper chamber, as shown in FIG. 7. In this condition, the gap between the waveguide segments represented by 116 and 118 is liquid-free, so that the switching element is in the reflecting state. A rapid return to the transmitting state can be achieved by energizing the upper microheater 104 to propel the liquid downwardly. Alternatively, the switching element can be left in the reflecting state for an extended period of time. The details of the fluid flow and menisci depend upon the wetting properties of the materials that come into contact with the liquid. In order to maintain the liquid within the desired chamber, it may be preferential to operate the switching element in an orientation that is less susceptible to the effects of gravitation. For example, the switching element may be rotated 90° relative to the orientation of FIGS. 6 and 7. However, gravitational effects are likely to be minor, regardless of the orientation of the switching element. Continuing to establish a low current through a microheater after initial rapid ejection may also aid in the control of bubble and fluid locations. Optionally, high resistance capillary-fill ports may be added to fill the chambers, maintain the interior of the element in a clean condition, and allow degassing of liquids after filling.

Figure 8:
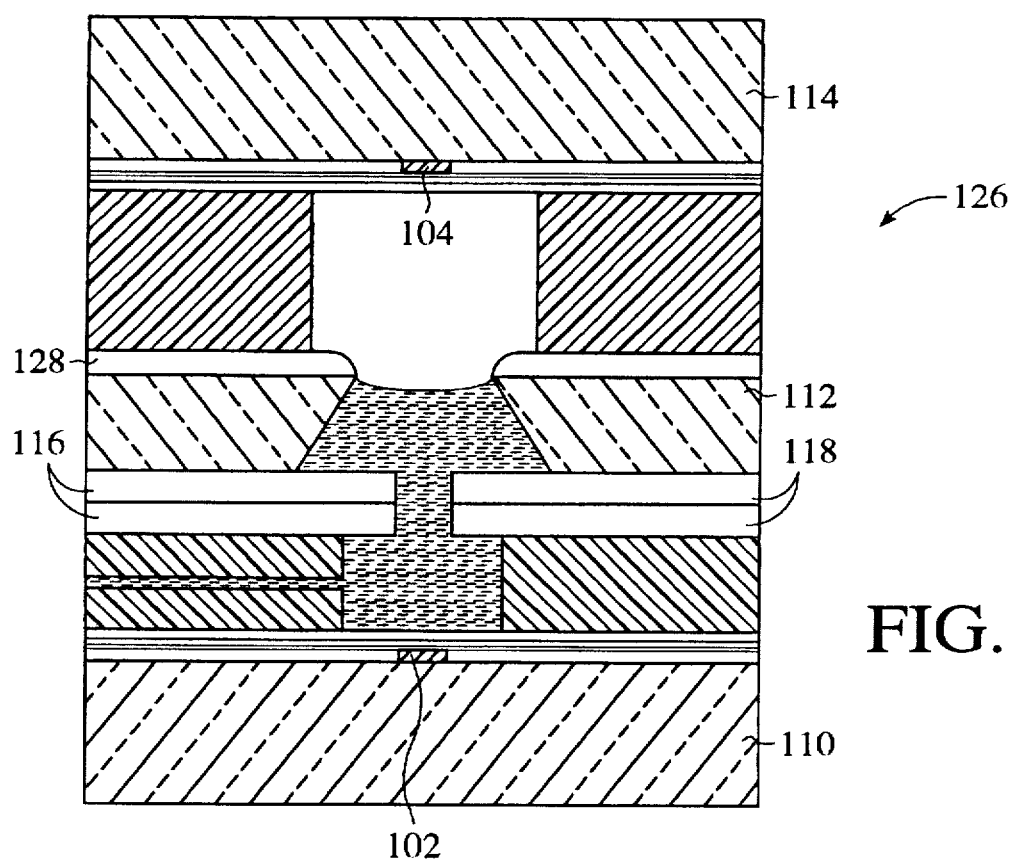
FIGS. 8 and 9 are side sectional views of the switching element of FIGS. 6 and 7, shown with an additional layer to provide an hour-glass configuration to pin a meniscus when the switching element is in the reflecting state of FIG. 9.
Figure 9:
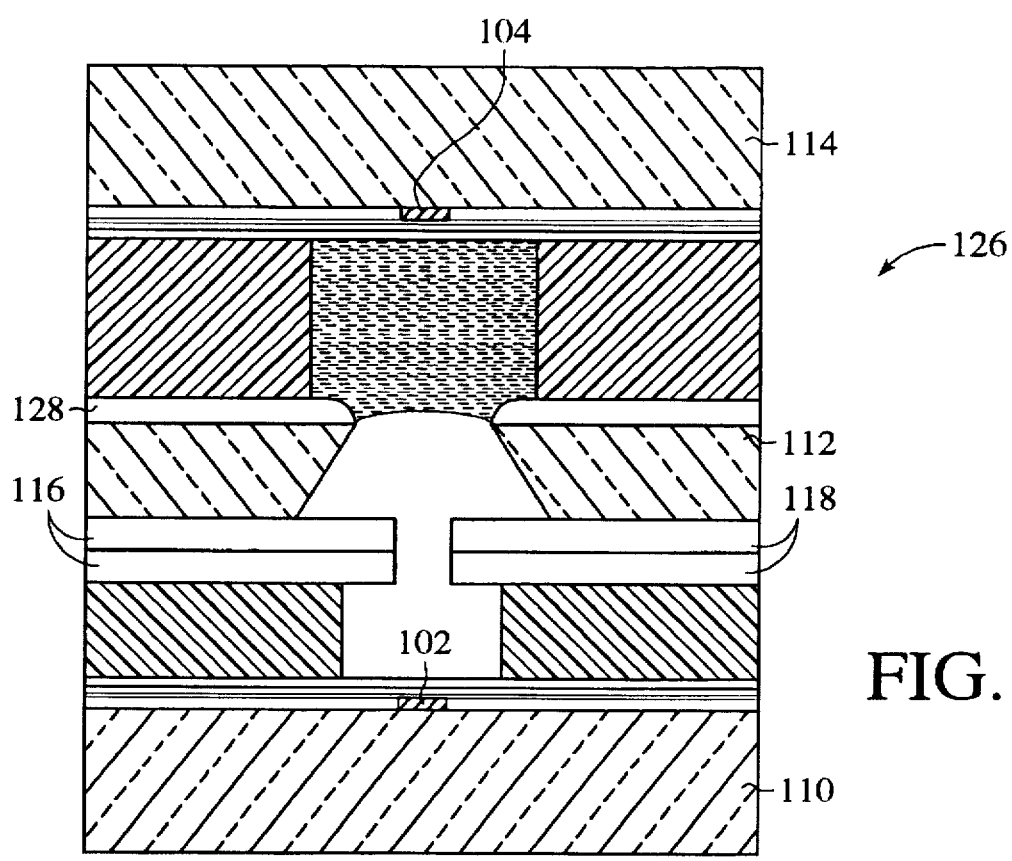

Referring now to FIGS. 8 and 9, another embodiment of a switching element 126 is shown. Since most of the elements of switching element 126 are identical to the elements of the switching element 100 of FIGS. 6 and 7, the reference numerals have been repeated. However, the switching element 126 includes an additional layer 128. In the reflecting state of FIG. 9, the added layer 128 provides a pinchoff point in the shape of the upper chamber, so as to pin the meniscus in the position shown in FIG. 9. Consequently, the switching element remains in the reflecting state until the upper microheater 104 is energized. An acceptable material for forming the pinning layer 128 is electroformed nickel.

Figure 10:
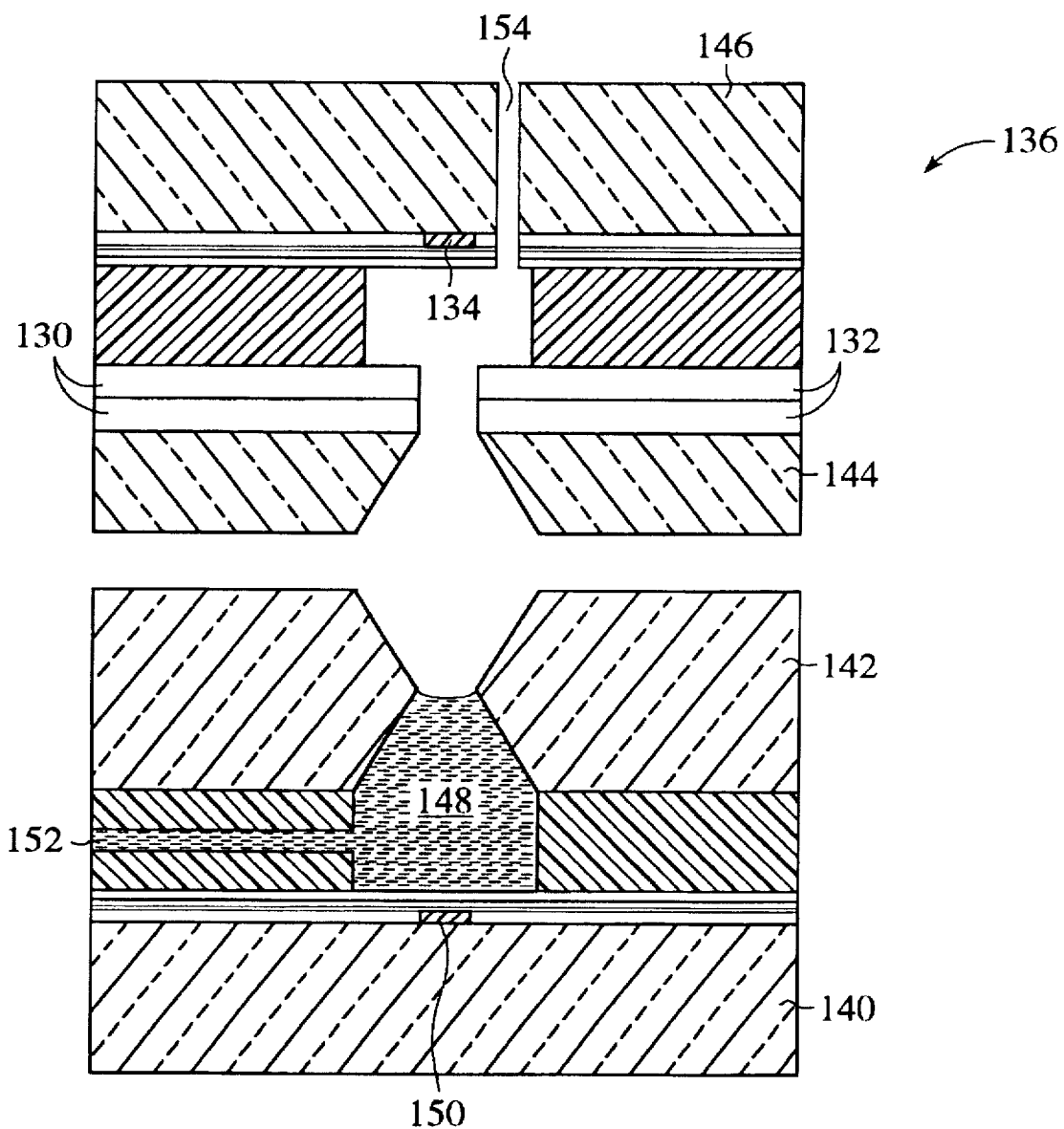
FIG. 10 is another embodiment of a switching element using aligned jet mechanisms that have free space therebetween, with the switching element being in a reflecting state.
Figure 11:
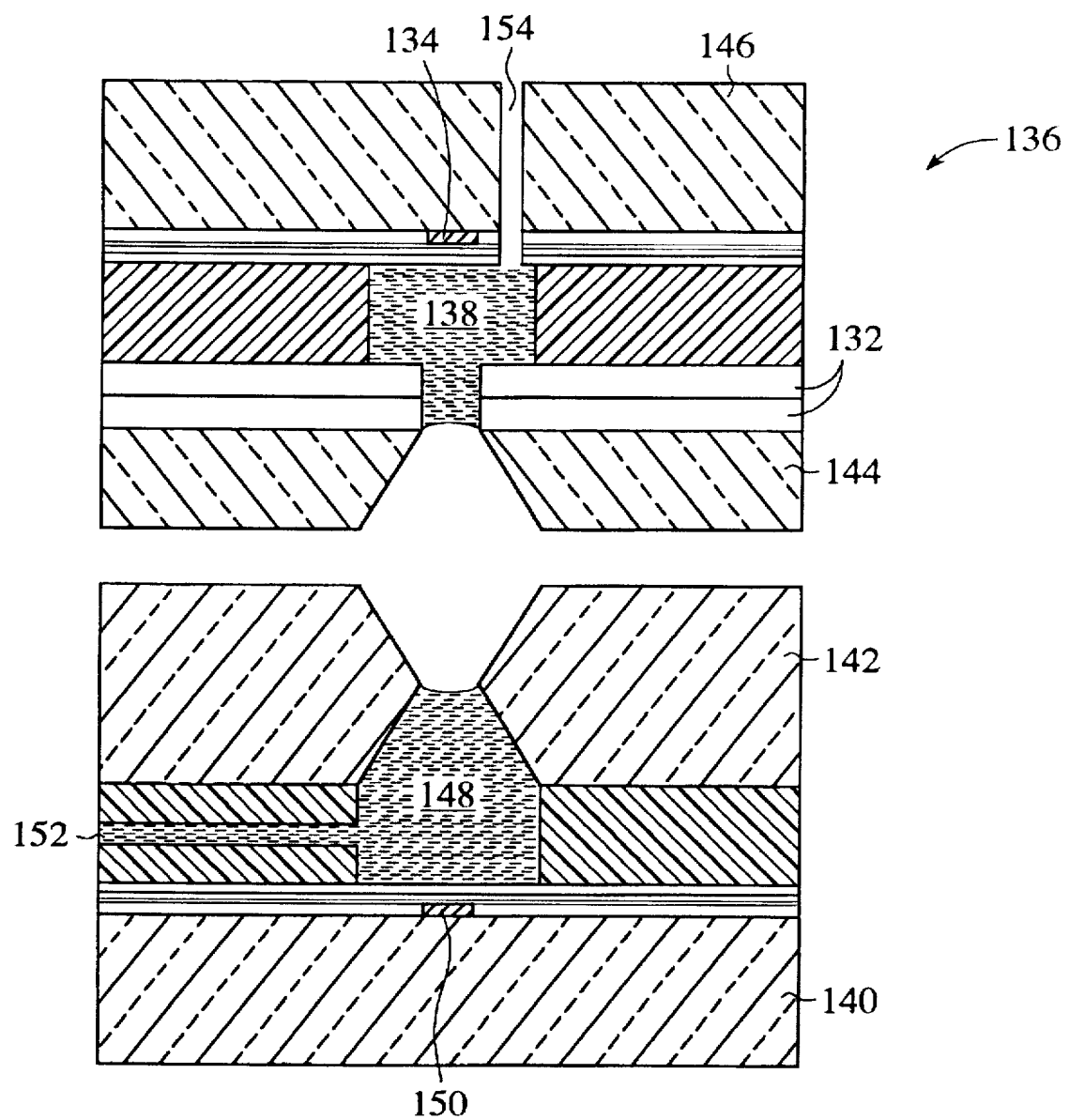
FIG. 11 is the switching element of FIG. 10 shown in a transmitting state.

Yet another embodiment that incorporates inkjet technology is shown in FIGS. 10 and 11. In this embodiment, the two waveguides 130 and 132 that are to be selectively coupled are attached closer to a heater 134 of an upper jet mechanism. The switching element 136 is shown in a transmitting state in FIG. 11, since index-matching fluid 138 is located within the gap between the two waveguides. However, when the upper microheater 134 is energized, the fluid begins to vaporize and is quickly projected downwardly. The switching element includes four substrates 140, 142, 144 and 146, such as semiconductor wafers. The center two substrates 142 and 144 are spaced apart from each other. The fluid that is projected from the upper jet mechanism enters the lower chamber, guided by the funnel configuration of the opening in substrate 142. Fluid that is ejected into the lower chamber is drawn back into a supply reservoir through a channel 152 by capillary action. However, the spacing between substrates 142 and 144 is sufficiently large to prevent capillary refill of the chamber of the upper jet mechanism. The spacing is also sufficiently large to prevent capillary action from drawing fluid into the spacing from either the top chamber or from a lower chamber having refill index-matching fluid 148. Spacing in the range of 100 to 1,000 µm is considered to be sufficient.

FIG. 10 shows the switching element 136 in the reflecting state, since the index-matching fluid has been projected from the gap between the waveguides 130 and 132. However, the fluid 148 in the lower chamber is positioned to be projected into the upper chamber to return the switching element to its transmitting state. The meniscus is pinned at the "waist" of the hourglass configuration formed in the substrate 142. Such a configuration can be obtained by wet etching a thin piece of (100)-oriented silicon with the same mask from the opposite sides of the silicon substrate. When a microheater 150 of the lower jet mechanism is energized, the fluid 148 is projected into the chamber of the upper jet mechanism to return the switching element to the transmitting state of FIG. 11. The lower chamber is connected to a reservoir of fluid through a flow channel 152, so that capillary action keeps the lower chamber filled up to the meniscus level shown in the drawings. An air vent 154 is formed through the uppermost substrate 146, rendering the upper jet mechanism less susceptible to entrapment of gas bubbles.

Figure 12:
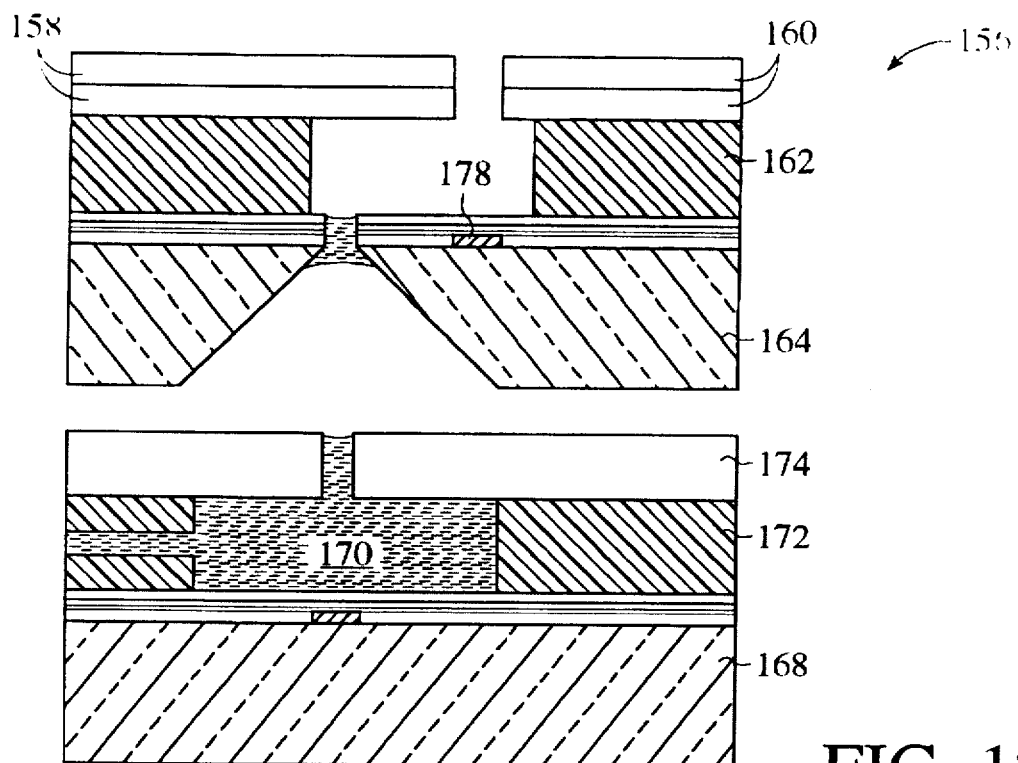
FIG. 12 is a side sectional view of a switching element utilizing misaligned jet mechanisms, with the element being shown in a reflecting state.
Figure 13:
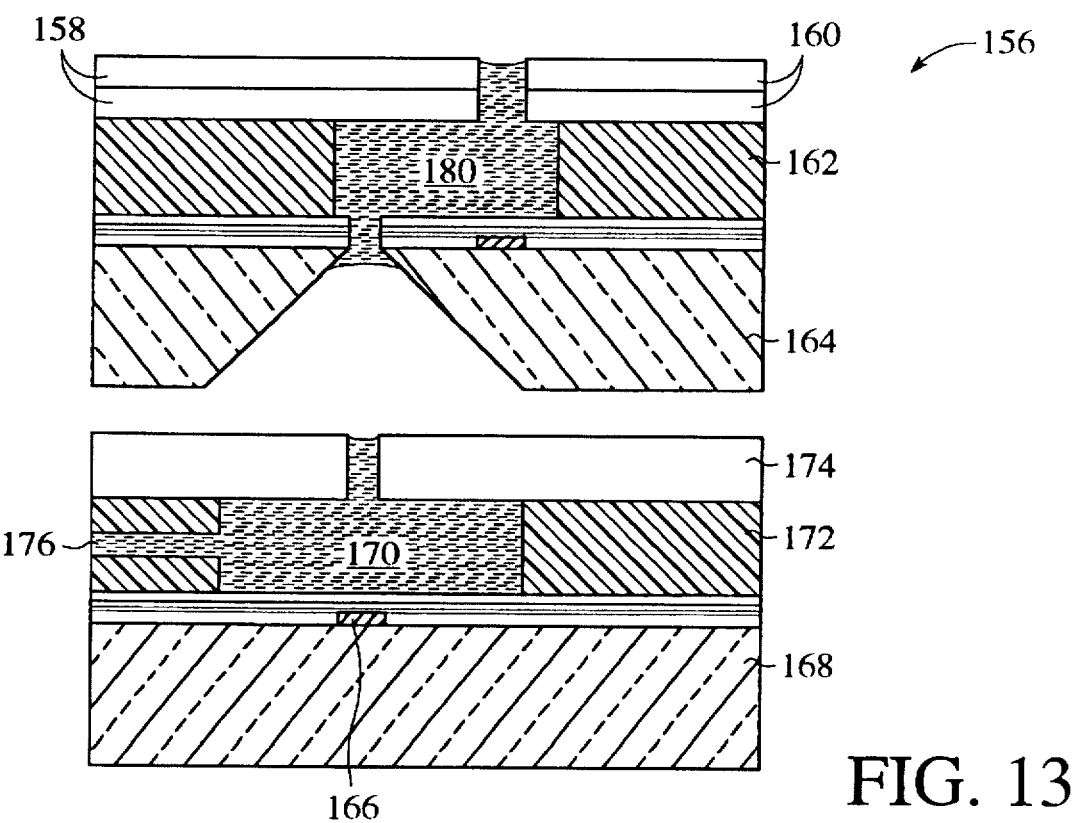
FIG. 13 is a side sectional view of the element of FIG. 12 shown in a transmitting state.

The embodiment of FIGS. 12 and 13 is one in which the switching element 156 has two upwardly directed jet mechanisms. Optical waveguides 158 and 160 are formed on a substrate layer 162, which is etched to define chambers, and the resulting waveguide structure is then bonded to a heater structure that includes substrate 164. As previously noted with reference to FIGS. 4 and 5, each of the waveguides in the two-dimensional drawing represents two waveguide segments. This note also applies to the side sectional drawings that will be referred to below. The two sections may be at a 90° angle to each other, but other angles are possible. The funnel configuration at the bottom side of the heater substrate 164 can accommodate excess fluid in the case of a fluid volume mismatch between the chambers in the upper portion and the lower portion of the switching element. The gap between the waveguides 158 and 160 should be narrow, e.g. between 5 μm and 25 μm, in the direction of light propagation. However, the gap between the waveguides should be wider in the perpendicular direction, i.e. in the direction perpendicular to the drawing, in order to keep the fluid resistance less than that of the lower entrance to the top chamber.

Since there is no index-matching liquid within the gap between the two waveguides 158 and 160, the switching element 156 is shown in a reflecting state in FIG. 12. On the other hand, FIG. 13 shows the top chamber and the gap between the waveguides in a liquid-filled condition. Consequently, the switching element is in a transmitting state. The top chamber is filled by energizing a lower microheater 166 on a lower substrate 168. Index-matching liquid 170 in a lower chamber formed by a polymer layer 172 and an orifice-forming layer 174 is fired upwardly into the top chamber. The lower chamber is refilled by means of capillary action through a flow path 176.

The switching element 156 is returned to the reflecting state of FIG. 12 by energizing an upper microheater 178. The liquid 180 is fired upwardly through the gap between the two waveguides 158 and 160.

The dimensions of the chamber and nozzle of the lower jet mechanism of switching element 156 can be chosen so that the liquid 170 in the lower chamber is not entirely ejected from the chamber. The fluid volume ejected by the lower jet mechanism is chosen to be sufficiently large to completely fill the upper chamber, but at the same time enough fluid is retained within the lower chamber to allow rapid projection of additional fluid, if desired. The second projection from the lower chamber is preferably no greater than 20 μs after the first.

Figure 18:
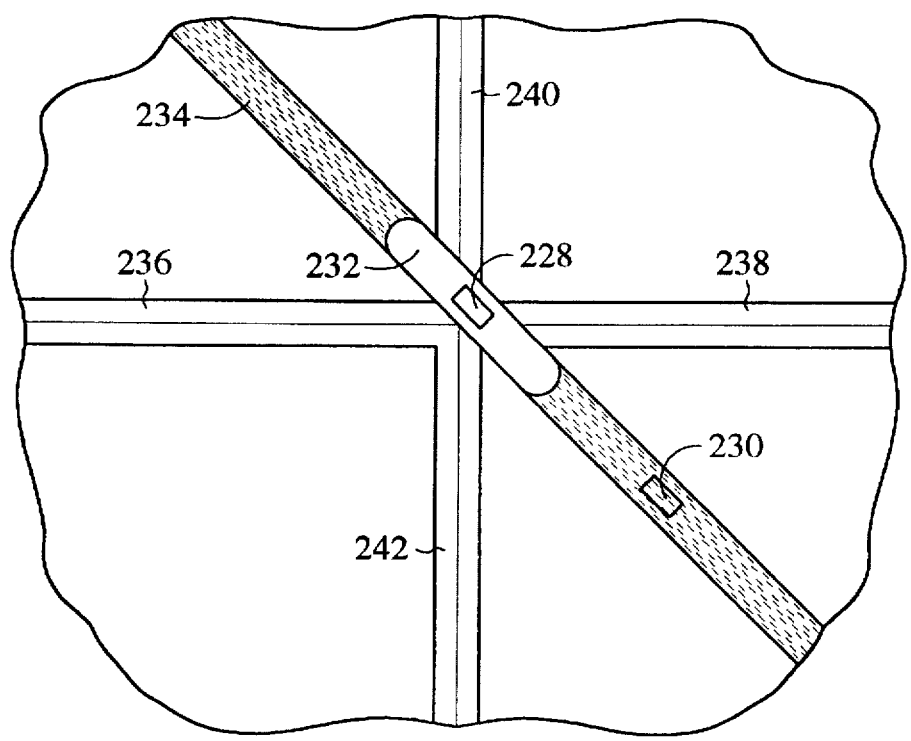
FIG. 18 is a top view of a switching element using gas bubble-manipulation techniques, with the switching element being in a reflecting state.
Figure 19:
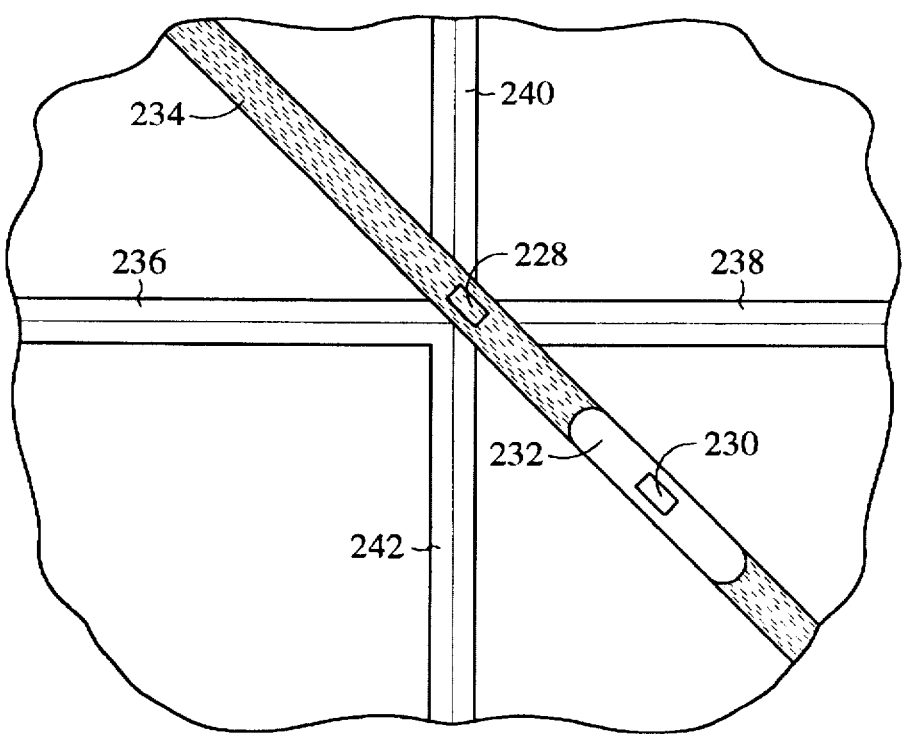
FIG. 19 is a top view of the switching element of FIG. 18 in a transmitting state.

The embodiments illustrated in FIGS. 3–13 utilize jet mechanisms that employ inkjet techniques to direct liquid flow perpendicular to a waveguide plane. On the other hand, the embodiment of FIGS. 14 and 15, the embodiment of FIGS. 16 and 17, and the embodiment of FIGS. 18 and 19 utilize bubble techniques. In the first and second of these three embodiments, a microheater is selectively energized to form a vapor bubble that causes total internal reflection. The switch may be returned to a transmitting state by terminating current flow to the heater, thereby allowing condensation to collapse the bubble. In the embodiment of FIGS. 18 and 19, a pair of heaters is used to manipulate a thermally generated gas bubble between positions, thereby changing the element between transmitting and reflecting states.

Figure 14:
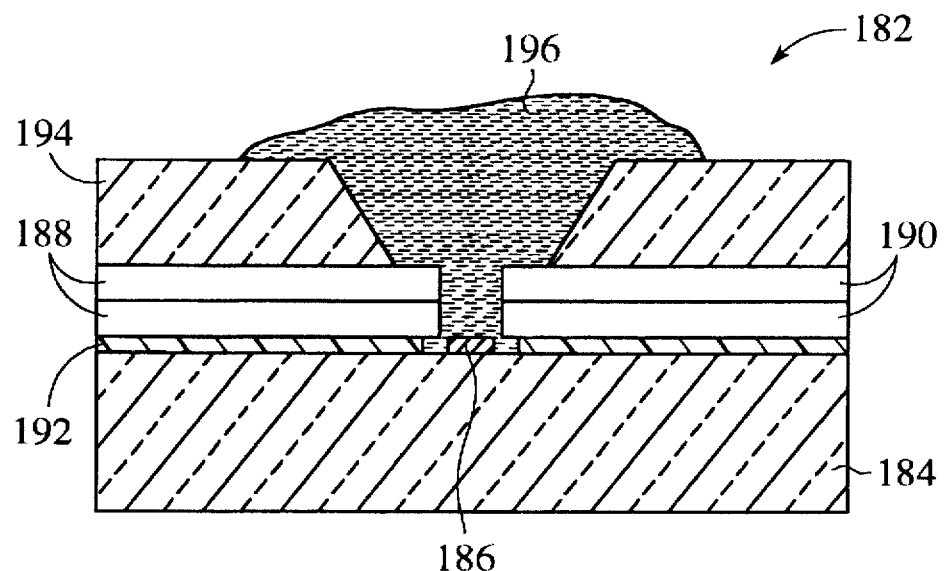
FIG. 14 is a side sectional view of a switching element using bubble techniques to control transmission between a pair of optical lines, shown in a transmitting state.
Figure 15:
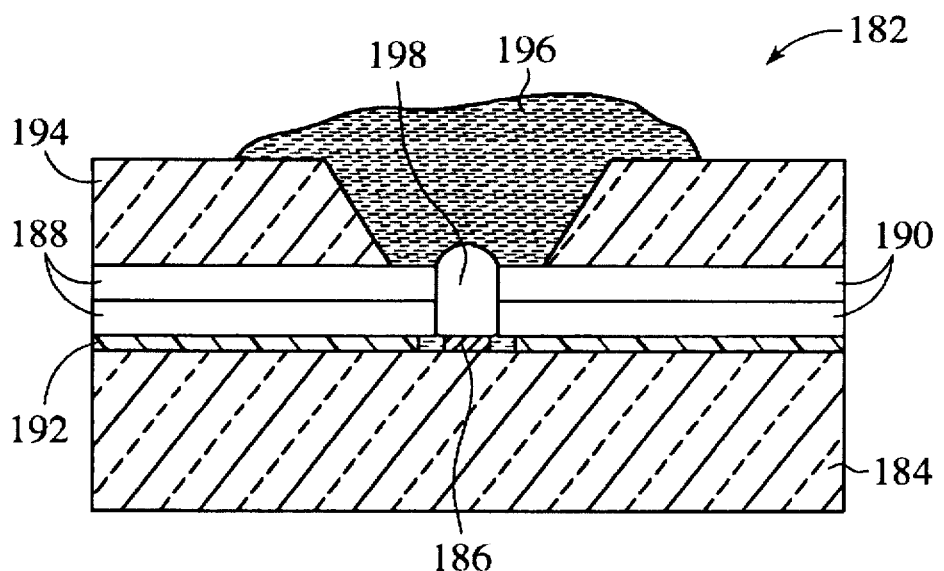
FIG. 15 is a side sectional view of the switching element of FIG. 14, shown in a reflecting state.

The bubble switching element 182 of FIGS. 14 and 15 includes a silicon substrate 184 on which a microheater 186 is fabricated. In an alternate embodiment, another type of substrate, such as glass, may be used. A pair of intersecting waveguides 188 and 190 spaced apart at a trench are fabricated on a second semiconductor or silica wafer 194. The second semiconductor wafer is shown in an inverted position, so that the "upper" cladding layer of the waveguides 188 and 190 is bonded to a spacer layer 192 on the lower substrate 184. The spacer layer is preferably an adhesive polymer related to those used to form inkjet chamber walls, but may also be phosphosilicate glass. An opening is etched into the waveguide substrate 194. The trench and the gap between the waveguides are aligned with the microheater 186. The solid portion of the switching element 182 is immersed in index-matching liquid 196. When the microheater 186 is energized, the index matching liquid 196 begins to vaporize. A vapor bubble 198 is formed at the gap between the two waveguides 188 and 190 in FIG. 15. The vapor bubble creates an index mismatch that causes optical signal reflection to occur, rather than transmission. Once the vapor bubble is formed, the current to the microheater 186 can be reduced to a low level without collapsing the bubble. However, if the switching element 182 is to be returned to its transmitting state of FIG. 14, current flow to the microheater is terminated, allowing the vapor to condense.

The microheater 186 is shown as being formed on the upper surface of the lower substrate 184. Alternatively, shallow depressions may be formed in a silicon substrate to collect the fluid, and the microheaters may be formed by depositing electrically resistive material into the etched wells. The waveguides 188 and 190 can be bonded directly to the silicon heater structure. The bonding process may or may not include depositing an adhesive polymer layer or a metal layer 192, such as a gold layer, on the heater structure 184 prior to bonding to the waveguides 188 and 190. A Cr layer may also be introduced in order to promote adhesion. The use of silicon substrates is not critical to the invention. Other materials may be used to form the substrates, as long as the materials exhibit the appropriate thermal properties. If possible, it would be desirable to match the thermal expansion coefficients of the substrates to the $SiO_2$ cladding layers of the waveguides.

Figure 16:
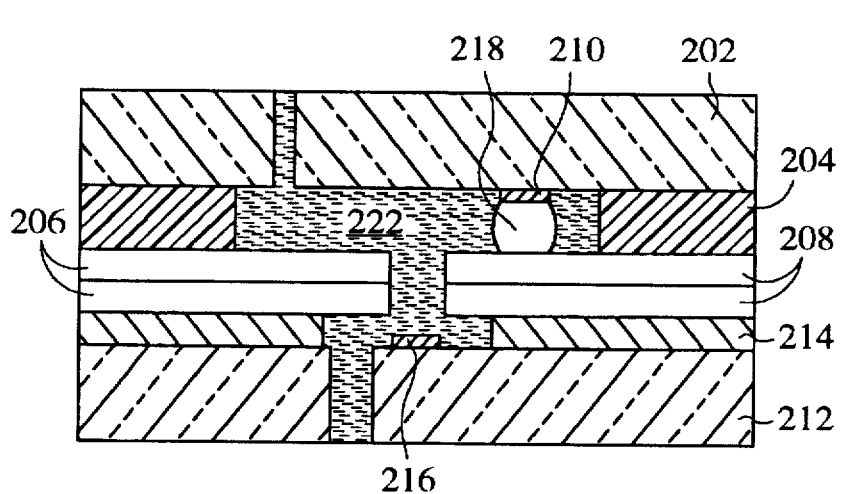
FIG. 16 is another embodiment of a switching element utilizing bubble techniques, with a second, offset microheater to enhance switching speed, shown in a transmitting state.
Figure 17:
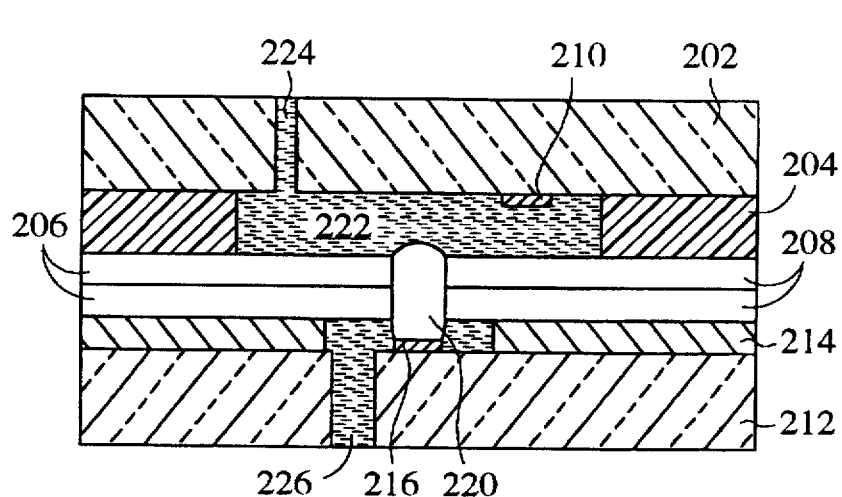
FIG. 17 is a side sectional view of the switching element of FIG. 16, shown in a reflecting state.

Another switching element 200 that utilizes bubble techniques is shown in FIGS. 16 and 17. An inverted upper substrate 202 is bonded to another substrate 204 onto which first and second waveguides 206 and 208 are formed and into which chamber-defining walls have been etched. Formed on the upper substrate 202 is a microheater 210. The waveguides 206 and 208 are bonded to a lower substrate 212 using an adhesion-promoting layer 214. The lower substrate includes a second microheater 216 that is aligned with the gap between the two waveguides.

Only one of the two microheaters 210 and 216 is energized at a given time. When one of the microheaters is energized, it causes a vapor bubble 218 and 220 to be formed from a volume of index-matching liquid 222. In practice, the presence of dissolved gas in the fluid could enhance vapor bubble nucleation. The vapor bubble 220 is formed by conducting current through the lower microheater 216. Since the lower microheater is aligned with the gap between the two waveguides 206 and 208, the vapor bubble 220 creates an index mismatch that causes total internal reflection of an optical signal between the waveguide segments represented by 206. Termination of current flow through the lower microheater will initiate condensation that will return the switching element 200 to its transmitting state. However, the switching rate can be increased by forcibly moving the vapor bubble while it is collapsing. This is achieved by energizing the upper microheater 210 to form the vapor bubble 218. While the upper vapor bubble 218 is being formed, the lower vapor bubble 220 will be expelled from the gap between the two waveguides 206 and 208.

FIGS. 16 and 17 do not show the leads to the two microheaters 210 and 216. It may be easiest to penetrate the leads through the substrates 202 and 212, but leads may be formed to run along the surface of the substrates. As shown in FIGS. 16 and 17, one of the microheaters should be misaligned with the gap between the two waveguides 206 and 208, so that forming a vapor bubble by activating the misaligned heater provides the force for displacing the vapor bubble formed by the other heater.

A high resistance upper fill port 224 may be incorporated through the upper substrate 202. The fill port is allowed to remain open during operation. This permits a net fluid flow through the switching element 200, promoting a clean chamber for the volume of liquid 222 and allowing degassing after filling. A lower fill port 226 can have a somewhat lower resistance in order to facilitate moving the bubble away from the lower heater 216. Alternatively, the ports may be sealed after the chamber has been filled.

Figure 28:
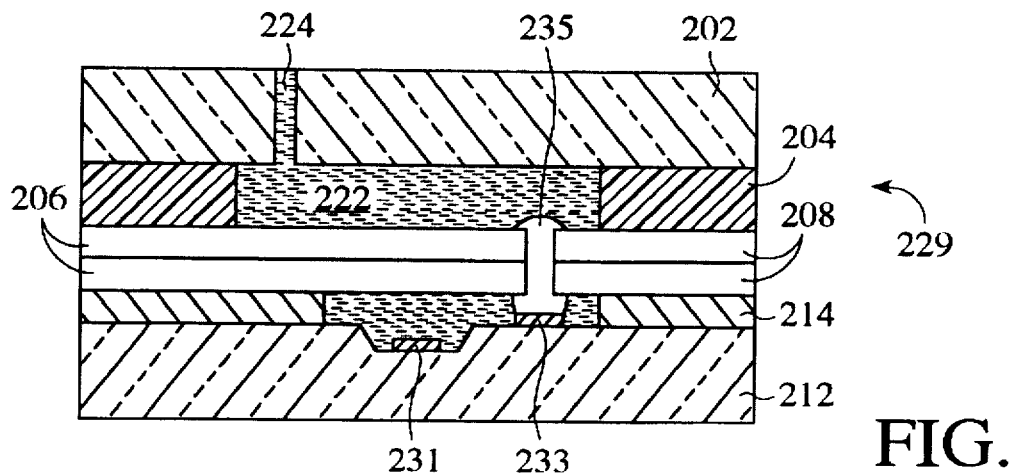
FIG. 28 is a side sectional view of an alternative embodiment of a switching element that utilizes bubble techniques and multiple microheaters to enhance switching speed, with the switching element being shown in a reflecting state.

FIG. 28 is another embodiment of a switching element 229 that includes a second microheater 231 to increase the switching rate of the element. Reference numerals are duplicated in this figure for components that are substantially the same as components of the embodiment of FIGS. 16 and 17, since the structure and the operation of the two embodiments are similar. The only significant difference is that the lower substrate 212 includes both of the microheaters 231 and 233 that are used to switch states of the element 229 of FIG. 28. This may lead to a reduction in fabrication complexity. The first microheater 233 is positioned to form a vapor bubble 235 in the gap between the two waveguides 206 and 208. The vapor bubble is formed when current is conducted through the first microheater. Termination of current flow through the first microheater will initiate condensation. However, as in FIGS. 16 and 17, the switching rate is increased by forcibly moving the vapor bubble 235 while it is collapsing. This is achieved by activating the second microheater 231 to form a second vapor bubble, not shown, that expels the collapsing vapor bubble 235 from the gap between the waveguides.

FIGS. 18 and 19 illustrate another embodiment of the invention. Rather than the inkjet approaches of FIGS. 3–13 or the vapor bubble approaches of FIGS. 14–17, the embodiment of FIGS. 18 and 19 implements a gas-bubble manipulation approach. In this embodiment, there are two microheaters 228 and 230 that control the position of a gas bubble 232. Unlike the vapor bubble described above, the gas bubble of this embodiment is formed in a fluid containing dissolved gas by degassing at a heater. One of the microheaters is brought to a temperature less than that necessary to vaporize fluid, but sufficiently high to form the gas bubble. Once formed, this bubble can be maintained in position with a smaller current to the microheater. Unlike vapor bubbles, these gas bubbles persist after the microheater has been turned off. However, the bubble may or may not float away from the microheater. The two microheaters can then be controlled to manipulate the gas bubble along a trench 234 that intersects a pair of waveguides. A first waveguide includes an input segment 236 and an output segment 238. The second waveguide includes an input segment 240 and an output segment 242.

In FIG. 18, the gas bubble 232 is located at the intersection of the first and second waveguides. Consequently, an input signal along the segment 236 will encounter an impedance mismatch upon reaching the trench 234. TIR causes the input signal to be diverted to the output segment 242 of the second waveguide. Thus, the switching element is shown in a reflecting state in FIG. 18. The activation of the microheater 228 at the intersection pins the gas bubble. The reflecting state is maintained as long as the microheater 228 is activated.

In FIG. 19, the microheater 228 at the intersection of the first and second waveguides has been deactivated and the second microheater 230 has been activated. The gas bubble 232 is strongly attracted to the activated microheater. This allows index-matching liquid to fill the gap at the intersection of the first and second waveguides. The switching element is in a transmitting state, since the input section 236 of the first waveguide is optically coupled to the output section 238 of that waveguide and the input section 240 of the second waveguide is optically coupled to its output section 242. The activation of the second microheater 230 draws the gas bubble 232. The second microheater is necessary because the "dissolved" gas bubble persists after the first microheater has been deactivated, and must be pulled away from the intersection of the waveguides to obtain rapid and reliable operation. This is in contrast to the vapor bubbles described above. An acceptable liquid for this embodiment is a combination of isopropyl alcohol and glycerol. Another acceptable liquid is M-pyrol. This configuration is similar to that of FIGS. 14 and 15, but with a second heater added away from the intersection. Multiple heaters may be needed to guide the gas bubble away from the intersection if the bubble extends too far along the trench.

Device reliability and performance will likely be enhanced if the switch matrix is hermetically sealed in an atmosphere saturated with fluid in order to discourage evaporation. For the case of vapor bubble operation, avoiding other gas or dissolved gas is desirable. Alternatively, helium could be used to promote degassing of gas bubbles in the fluid. For the case of dissolved gas bubble operation, an appropriate dissolved gas should be included in the containment vessel. Vapor bubbles will require expansion space in the containment vessel, since the gaseous state occupies a much larger volume than the liquid state. This expansion capability may be provided by a diaphragm.

Process steps for fabricating one embodiment of the invention are shown in FIGS. 20–26. While the process steps form a structure that most closely resembles the embodiment of FIGS. 14 and 15, many of the process steps may be used in forming any of the embodiments of FIGS. 3–19.

Figure 20:
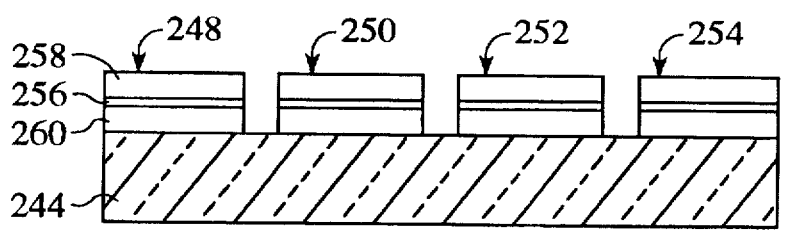
FIGS. 20–26 illustrate process steps of fabricating one embodiment of the invention.

In FIG. 20, a waveguide substrate 244 has a number of waveguide segments 248, 250, 252 and 254 formed on the waveguide substrate 244. As previously noted, each of the waveguide segments 248–254 may represent two segments. For example, component 248 may be both the input segment 20 and the output segment 22 of FIG. 1, while component 250 is the input segment 24 and the output segment 26 of FIG. 1.

Each of the waveguide segments 248–254 is formed using techniques known in the art. A waveguide includes a core 256 that is sandwiched between an upper cladding layer 258 and a lower cladding layer 260. As previously noted, the waveguide substrate and waveguides may be purchased to specification from Hitachi Cable or Photonic Integration Research, Inc. An acceptable material for the core layer 256 is $SiO_2$ and an acceptable material for the substrate is silicon, but other materials may be used. Flame hydrolysis deposition techniques and reactive ion etching may be used for forming the waveguide sections, with consolidation (cooking) also being employed. The trenches separating the waveguide segments may be formed using reactive ion etching.

Figure 21:
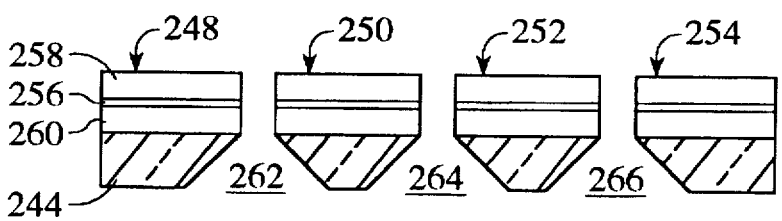

In FIG. 21, through holes 262, 264 and 266 have been etched through the waveguide substrate 244. To form these holes, the substrate is lapped and polished. Etching of the silicon substrate may be in tetramethylammonium hydroxide (TMAH) or in a reactive ion etching system. The structure of FIG. 21 is then ready for attachment to a microheater substrate.

Figure 22:
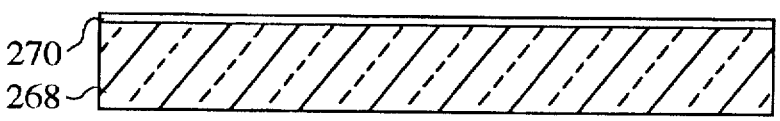
Figure 23:
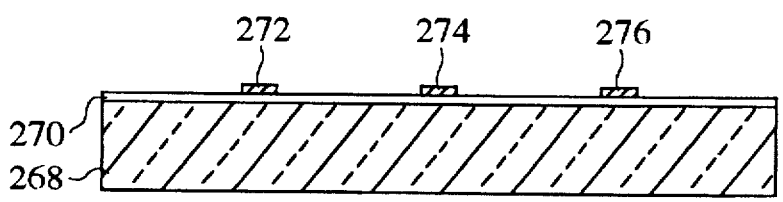

In FIG. 22, a thermal underlayer 270 is formed on the microheater substrate 268. This underlayer may be $SiO_2$ or $SiN_x$ or any other material having similar properties. As shown in FIG. 23, microheaters 272, 274 and 276 are formed on the underlayer 270. The fabrication of the microheaters may be identical to formation of microheaters for inkjet applications. Acceptable materials for the microheaters are TaAl, TAN$_x$, W, or polysilicon.

Figure 24:
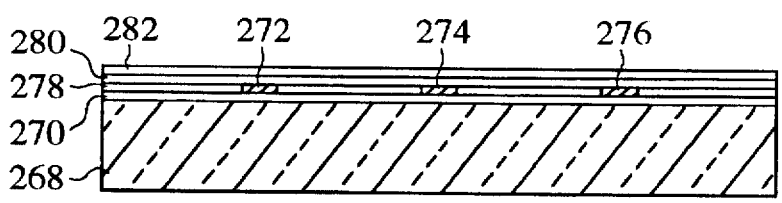
Figure 25:
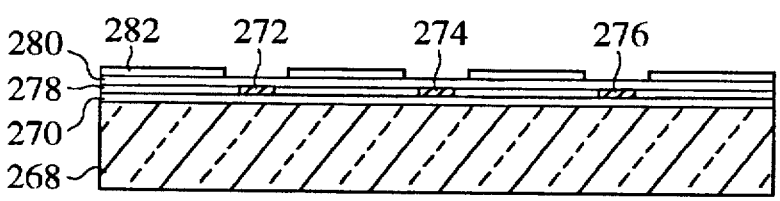
Figure 26:
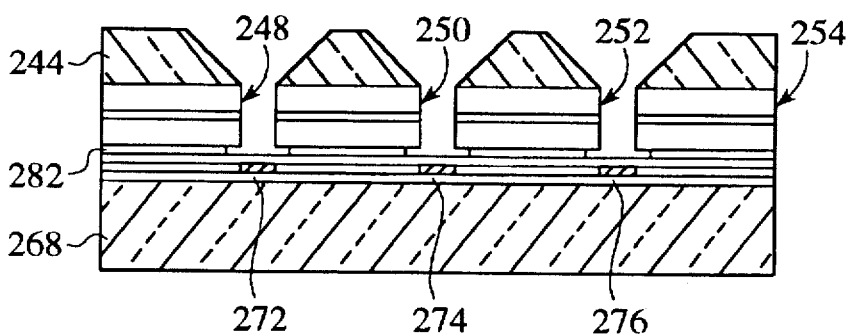

In FIGS. 24 and 25, a number of layers 278, 280 and 282 are deposited and etched. These layers are provided to form leads to and from the microheaters 272–276, to provide electrical passivation, to provide mechanical protection, and to bond the microheater substrate 268 to the waveguide structure 248–254. The patterning that occurs to provide the structure of FIG. 25 has two functions. Firstly, the patterning opens spaces in the bonding material at the microheaters 272–276. Secondly, the patterning provides a planar surface for bonding the structure of FIG. 25 to the structure of FIG. 21. The bonded structures are shown in FIG. 26. The bonding layer 282 may be a photoimageable polymer, such as a photoimageable benzocyclobutene (BCB).

Manufacturing jet and bubble switches by bonding provides major advantages in switch function. The heater can be centered between the waveguide trench sidewalls and located close to the gap between the waveguide cores, separated from this gap by just fluid. The bubble is formed where it is needed. Alternative approaches have major drawbacks. Fabricating heaters directly on the waveguide substrate would be extremely difficult at the bottom of the narrow ($\leq 25$ µm) trenches required for low optical loss. Optical quality of the trenches would be compromised. If, alternatively, the heaters were fabricated on top of the waveguides, the heat would have to be conducted through SiO$_2$, which is thermally insulating, before a bubble could be created. This configuration would require more power and could cause burnout of heaters.

Figure 27:
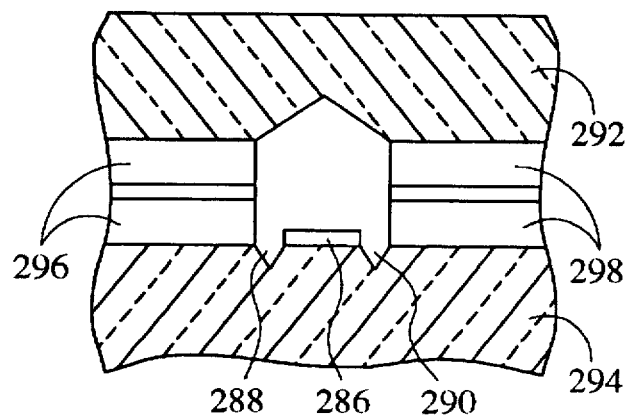
FIG. 27 is a side sectional view of a vapor or dissolved gas bubble embodiment in which trenches are formed in the heater substrate at opposed sides of a heater to increase the useful life of the heater and to increase vapor bubble stability.

FIG. 27 illustrates another embodiment of the invention. In this embodiment, the microheater 286 has minor trenches 288 and 290 on opposite sides. These minor trenches improve fluid flow to the heaters, thereby reducing the susceptibility of the heaters to burnout by providing cool fluid. They may also increase bubble stability by promoting dynamic equilibrium, with fluid boiling at the heaters and condensing at the top of the bubbles. Additionally, the embodiment of FIG. 27 includes a cap structure that is provided by the waveguide substrate 292, whose waveguides are bonded to the microheater substrate 294. The waveguide substrate 292 is not etched through, and may or may not have a V-shaped cut etched between two waveguide sections 296 and 298. This capped approach confines bubble growth and may be used in any of the bubble embodiments described above. Referring again to FIGS. 20–26, the capping may be achieved by not etching through holes 262, 264 and 266 in FIG. 21, so that the semiconductor material would extend across the entire structure in FIG. 26. Input/output paths for the fluid could be through the microheater substrate 268. Alternatively, a cap to confine bubble growth may be formed by applying a tape over holes etched through the waveguide substrate that is patterned to confine bubble growth, but with holes between switch elements.

It is not critical that the microheaters are rectangular or square. For example, the microheaters in the bubble embodiments may be triangular. There may be advantages to forming the microheaters to have an hourglass shape. Referring again to FIG. 18, the first microheater 228 would have an hourglass shape in which the narrowed region of the microheater is at the intersection of the waveguide segments 236–242. Since the waist of the heater should be hottest, the bubble should be located to provide TIR most readily. Other heater configurations are also possible.

Figure 29:
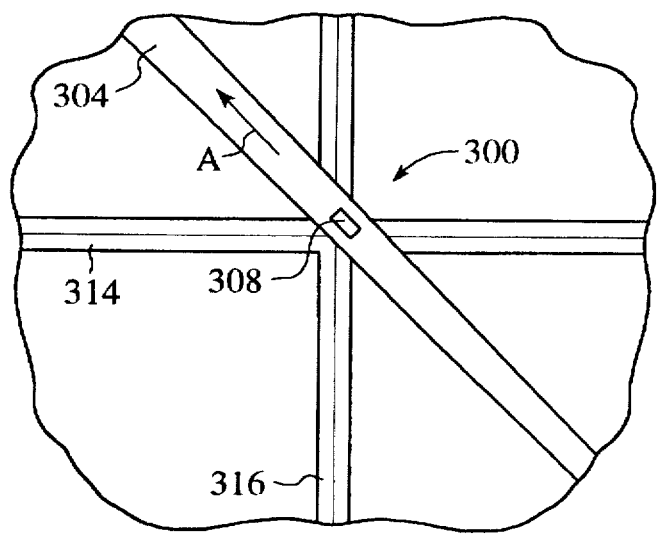
FIGS. 29 and 30 are top views of alternative single-heater and double-heater embodiments of switching elements having trenches that vary in width with departure from an intersection between two waveguides.
Figure 30:
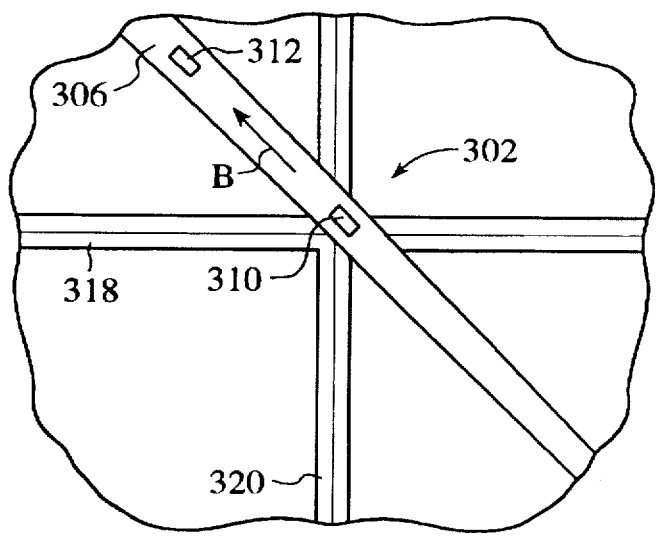

It is also possible to form trenches having varying dimensions. Referring now to FIGS. 29 and 30, for each of the two illustrated switching elements 300 and 302, a trench 304 and 306 is formed to increase in width in proportion to the distance a bubble will travel from the gap at the intersection between two waveguides. The direction of bubble travel is indicated by arrow A in FIG. 29 and arrow B in FIG. 30. It has been discovered that the expanding width of the trench promotes bubble displacement. This applies equally to a switching element 300 having a single heater 308 and to a switching element 302 having two heaters 310 and 312 that provide bubble displacement in the manner described with reference to FIGS. 18 and 19. By promoting bubble displacement in the directions of arrows A and B, there is a reduced chance that a tailing portion of a bubble will remain in the gap between waveguide segments when the switching element is intended to be in a transmitting state. In FIG. 29, the intersecting waveguides are identified by reference numerals 314 and 316. FIG. 30 includes waveguides 318 and 320.

We claim:

1. A switching element for use along an optical path comprising:

a waveguide substrate having at least two optical waveguide segments on a first surface of said waveguide substrate, including first and second waveguide segments having ends that intersect a gap, said first and second waveguide segments being in fixed relation and generally parallel to said surface;

a heater substrate having at least one heater, said heater substrate being joined to said waveguide substrate such that a first heater is aligned with said gap; and a liquid disposable within said gap, said liquid being responsive to said first heater, said liquid having an index of refraction such that optical transmission from said first waveguide segment to said second waveguide segment is determined by presence of said liquid within said gap.

2. The switching element of claim 1 wherein said first heater is in fixed relation to said waveguide and heater substrates to form a bubble within said liquid when said first heater is activated, thereby initiating displacement of said liquid relative to said gap.

3. The switching element of claim 1 wherein said heater substrate includes a jet mechanism that includes said first heater, said jet mechanism being aligned to project said liquid into said gap upon activation of said first heater.

4. The switching element of claim 1 wherein said heater substrate includes a jet mechanism that includes said first heater, said jet mechanism being aligned to eject said liquid from said gap upon activation of said first heater.

5. The switching element of claim 1 wherein said heater substrate is bonded to said waveguide substrate by a bonding layer.

6. The switching element of claim 1 wherein said gap has a sidewall at angles relative to axes of said first and second waveguide segments such that light reflected off said sidewall when said liquid is absent from said gap is diverted from said end of said first waveguide segment into said end of said second waveguide segment, said switching element further comprising a third waveguide segment that is axially aligned with said first waveguide segment such that light from said first waveguide segment enters said third waveguide segment when said liquid is within said gap.

7. The switching element of claim 1 wherein said first heater is in thermal communication with a volume of said fluid to selectively form a first vapor bubble in response to activation of said heater, said first vapor bubble undergoing condensation in response to deactivation of said heater, said heater being positioned relative to said gap such that said first vapor bubble forms within said gap.

8. The switching element of claim 7 further comprising a second heater in thermal communication with said volume of fluid to selectively form a second vapor bubble, thereby displacing said first vapor bubble from said gap.

9. The switching element of claim 1 wherein said gap is defined by a trench having sidewalls, and wherein with respect to at least one direction from the intersection between said first and second waveguide segments, said sidewalls increase in distance from each other with distance from said intersection.

10. The switching element of claim 1 wherein an angle of incidence of said first waveguide segment on said gap is generally 60 degrees.

11. A switching element for use along an optical path comprising:
  a waveguide substrate having at least two optical waveguide segments on a first surface of said waveguide substrate, including first and second waveguide segments having ends that intersect a gap, said first and second waveguide segments being in fixed relation and generally parallel to said surface;
  a heater substrate having first and second heaters, said heater substrate being joined to said waveguide substrate such that said first heater is aligned with said gap; and
  a liquid disposable within said gap, said liquid being responsive to activation of said first and second heaters, said liquid having an index of refraction such that optical transmission from said first waveguide segment to said second waveguide segment is determined by presence of said liquid within said gap;
  wherein said first and second heaters are controllable for generating a gas bubble and for selectively attracting said gas bubble, said first and second heaters being spaced apart and said first heater being positioned to attract said gas bubble to said end of said first waveguide segment.

12. A switching element for use along an optical path comprising:
  a substrate having a surface;
  a first optical waveguide segment having a first end that is in fixed relation to said substrate and directed generally parallel to said surface;
  a second optical waveguide segment having a second end that is in fixed relation to said substrate and directed generally parallel to said surface, said second end and said first end intersecting a gap;
  a liquid disposable within said gap, said liquid having an index of refraction such that optical transmission from said first optical waveguide segment to said second optical waveguide segment is determined by a presence of said liquid within said gap; and
  a jet mechanism aligned relative to said gap to displace said liquid in a direction generally perpendicular to said surface, said jet mechanism including a heater for generating thermal energy.

13. The switching element of claim 12 wherein said jet mechanism is directed at said gap to project said liquid into said gap upon activation of said heater.

14. The switching element of claim 13 further comprising a source of vacuum pressure selectively coupled to a side of said gap opposite to said jet mechanism, wherein liquid directed into said gap by said jet mechanism is removable via said selective coupling of said source to said gap.

15. The switching element of claim 12 wherein said jet mechanism is aligned to eject said liquid from said gap upon activation of said heater.

16. The switching element of claim 15 further comprising means for refilling said gap with liquid following said projection of liquid.

17. The switching element of claim 12 wherein said substrate is a first semiconductor heater substrate and said heater is a first microheater disposed on said first semiconductor heater substrate to initiate vaporization of said liquid such that said liquid is projected from said gap, said switching element further comprising a second semiconductor heater substrate and a second microheater, said first and second semiconductor heater substrates having a fixed parallel relationship, said second microheater being positioned on said second semiconductor heater substrate in thermal communication with a chamber formed on said second semiconductor heater substrate such that said second microheater selectively initiates vaporization of liquid within said chamber to project said liquid therefrom, said chamber being aligned relative to said first semiconductor heater substrate to project said liquid to fill said gap between said first and second optical waveguide segments, said waveguide segments being formed on a semiconductor waveguide substrate bonded between said first and second semiconductor heater substrates.

18. A switching arrangement for defining a transmitting state and a reflecting state comprising:
  a waveguide substrate having first and second waveguides aligned for optical communication when said transmitting state is defined, said first and second waveguides each having first and second waveguide segments, with each waveguide segment extending to a fluid chamber;
  a heater substrate bonded to said waveguide substrate, said heater substrate having heater means in thermal communication with said fluid chamber for forming one of a gas bubble and a vapor bubble between said waveguide segments of said first and second waveguides in response to activation of said heater means; and
  control means for activating and deactivating said heater means to initiate manipulation of fluid within said fluid chamber, said manipulation including an operation of thermal degassing and attraction if said bubble is a gas bubble and including an operation of vaporization and condensation if said bubble is a vapor bubble.

19. The switching arrangement of claim 18 wherein said fluid chamber is defined by at least one patterned layer on said substrate, said heater means including a first microheater electrically connected to said control means.

20. The switching arrangement of claim 19 further comprising a second microheater positioned relative to said fluid chamber to induce displacement of said bubble.

21. The switching element of claim 18 wherein said fluid chamber is defined by a trench having an increasing width in the direction of said intended bubble displacement.

22. An optical routing matrix comprising:
  a waveguide substrate;
  an array of generally parallel first waveguides extending parallel to said waveguide substrate to define first optical paths;
  an array of generally parallel second waveguides extending parallel to said waveguide substrate to define second optical paths that intersect said first optical paths at fluid chambers; and a heater substrate joined to said waveguide substrate, said heater substrate having microheaters in thermal communication with said fluid chambers to form bubbles within said fluid chambers, each fluid chamber being operatively associated with one of said microheaters and being configured such that fluidic changes as a result of activation of said operatively associated microheater determine a presence of fluid in said fluid chamber.

23. The matrix of claim 22 further comprising a refractive index matching liquid within at least some of said fluid chambers, wherein optical signals continue in a substantially linear manner through fluid chambers having said liquid and wherein said optical signals are reflected from a first waveguide to a second waveguide at fluid chambers having an absence of said liquid.

24. A method of fabricating a switching element for an optical path comprising steps of:

forming a waveguide substrate having first and second intersecting waveguides;

forming a trench at an intersection of said first and second waveguides a trench for receiving a liquid having an index of refraction such that optical transmission between said first and second waveguides is determined by presence of said liquid at said intersection;

forming a heater substrate having a heating element;

aligning said heater substrate with said waveguide substrate such that said heating element is aligned with said intersection; and bonding said aligned heater and waveguide substrates.

25. The method of claim 24 wherein said step of bonding said aligned heater and waveguide substrates together includes forming a bonding layer prior to bonding.

26. The method of claim 25 wherein said step that includes forming said bonding layer includes applying a generally planar layer of bonding material.

27. The method of claim 26 wherein said step that includes forming said bonding layer further includes patterning said planar layer to remove a portion aligned with said heating element.

* * * * *